(12) United States Patent
Bergman et al.

(10) Patent No.: US 6,564,263 B1
(45) Date of Patent: May 13, 2003

(54) MULTIMEDIA CONTENT DESCRIPTION FRAMEWORK

(75) Inventors: Lawrence David Bergman, Mt. Kisco, NY (US); Michelle Yoonk Yung Kim, Scarsdale, NY (US); Chung-Sheng Li, Ossining, NY (US); Rakesh Mohan, Stamford, CT (US); John Richard Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/456,031

(22) Filed: Dec. 3, 1999

Related U.S. Application Data
(60) Provisional application No. 60/110,902, filed on Dec. 4, 1998.

(51) Int. Cl.[7] .......................... G06F 7/00; G06F 15/00; G06F 17/30; G06F 15/16
(52) U.S. Cl. ........................ 709/231; 707/3; 707/101; 707/500.1; 707/104.1; 709/232
(58) Field of Search ................... 709/231, 232; 707/101, 104.1, 500.1; 725/53, 135, 136, 137

(56) References Cited

U.S. PATENT DOCUMENTS

| | | | | |
|---|---|---|---|---|
| 6,014,671 A | * | 1/2000 | Castelli et al. | 707/101 |
| 6,061,689 A | * | 5/2000 | Chang et al. | 707/103 |
| 6,181,332 B1 | * | 1/2001 | Salahshour et al. | 345/302 |
| 6,181,817 B1 | * | 1/2001 | Zabith et al. | 382/170 |
| 6,223,183 B1 | * | 4/2001 | Smith et al. | 707/102 |
| 6,232,974 B1 | * | 5/2001 | Horvitz et al. | 345/419 |
| 6,249,423 B1 | * | 5/2001 | Hirata | 707/104 |
| 6,282,549 B1 | * | 8/2001 | Hoffert et al. | 707/104 |
| 6,317,795 B1 | * | 11/2001 | Malkin et al. | 709/246 |
| 6,326,965 B1 | * | 12/2001 | Castelli et al. | 345/420 |
| 6,345,279 B1 | * | 2/2002 | Li et al. | 707/104 |
| 6,377,995 B2 | * | 4/2002 | Agraharam et al. | 709/231 |
| 6,411,724 B1 | * | 6/2002 | Vaithiligam et al. | 382/100 |

OTHER PUBLICATIONS

Chung–Sheng Li, Rakesh Mohan, John R. Smith, "Multimedia Content Description In The InfoPyramid", May 1998, IEEE Proc. Int. Conf. Acoust., Speech, Signal Processing (ICASSP).*

John R. Smith, Rakesh Mohan, Chung–Sheng Li, "Scalable Multimedia Delivery for Pervasive Computing", Oct. 1999, ACM Multimedia.*

John R. Smith, Rakesh Mohan, Chung–Sheng Li, "Content–Based Transcoding of Images In the Internet", Oct. 1998, Proc. IEEE Proc. Int. Conf. Image Processing (ICIP), Chicago, Il,.*

Rakesh Mohan, John R. Smith, Chung–Sheng Li, "Adapting Multimedia Internet Content for Universal Access", Mar. 1999, IEEE Transactions on Multimedia, vol. 1, No. 1.*

* cited by examiner

*Primary Examiner*—Dung C. Dinh
*Assistant Examiner*—Marlon Johnson
(74) *Attorney, Agent, or Firm*—Douglas W. Cameron

(57) ABSTRACT

A framework is provided for describing multimedia content and a system in which a plurality of multimedia storage devices employing the content description methods of the present invention can interoperate. In accordance with one form of the present invention, the content description framework is a description scheme (DS) for describing streams or aggregations of multimedia objects, which may comprise audio, images, video, text, time series, and various other modalities. This description scheme can accommodate an essentially limitless number of descriptors in terms of features, semantics or metadata, and facilitate content-based search, index, and retrieval, among other capabilities, for both streamed or aggregated multimedia objects.

2 Claims, 19 Drawing Sheets

MULTIMEDIA CONTENT DESCRIPTION FRAMEWORK

This application claims priority to U.S. Provisional Application Serial No. 60/110,902, filed on Dec. 4, 1998.

STATEMENT OF GOVERNMENT RIGHTS

This invention was made with Government support under grants NCC5-101 and NCC5-305 awarded by the National Aeronautics and Space Administration (NASA). The Government has certain rights in the invention.

BACKGROUND OF THE INVENTION

1. Field of the Invention

The method and apparatus of the present invention relate generally to multimedia content description, and more specifically relate to a system for describing streams or aggregation of multimedia objects.

2. Description of the Prior Art

The number of multimedia databases and other archives or storage means, as well as the number of multimedia applications, have increased rapidly in the recent past. This is due, at least in part, to the rapid proliferation of digitalization of images, video, audio and, perhaps most importantly, to the availability of the Internet as a medium for accessing and exchanging this content in a relatively inexpensive fashion.

It is becoming increasingly more important for multimedia databases, multimedia content archives, Internet content sites and the like to provide interoperable capabilities for such functions including query, retrieval, browsing, and filtering of multimedia content. There are many new applications waiting to emerge when these multimedia storage means having multiple modalities are made available online for interaction with these applications. Some examples of multimedia applications that may benefit from such interoperability include:

- On-demand streaming audio-visual: In addition to video-on-demand type capabilities, there is a need to be able to browse and access audio-visual data based on the parametric values as well as the content.
- Universal access: Due to the rapid advance of pervasive computing devices, Internet appliances, eBook and the like, there is a growing need for automatic adaptation of multimedia content for use on a wide variety of devices based on a combination of client device capabilities, user preferences, network conditions, authoring policies, etc.
- Environmental epidemiology: Retrieve the location(s) of houses which are vulnerable to epidemic diseases, such as Hantavirus and Denge fever, based on a combination of environmental factors (e.g., isolated houses that are near bushes or wetlands) and weather patterns (e.g., a wet summer followed by a dry summer).
- Precision farming: (1) Retrieve locations of cauliflower crop developments that are exposed to clubroot, which is a soil-borne disease that infects cauliflower crop. Cauliflower and clubroot are recognized spectral signature, and exposure results from their spatial and temporal proximity; (2) Retrieve those fields which have abnormal irrigation; (3) Retrieve those regions which have higher than normal soil temperature.
- Precision forestry: (1) Calculate areas of forests that have been damaged by hurricane, fire, or other natural phenomenon; (2) Estimate the amount of the yield of a particular forest.
- Petroleum exploration: Retrieve those regions which exemplify specific characteristics in the collection of seismic data, core images, and other sensory data.
- Insurance: (1) Retrieve those regions which may require immediate attention due to natural disasters such as earthquake, fire, hurricane, and tornadoes; (2) Retrieve those regions having higher than normal claim rate (or amount) that are correlated to the geography—close to coastal regions, close to mountains, in high crime rate regions, etc.
- Medical image diagnosis: Retrieve all MRI images of brains having tumors located within the hypothalamus. The tumors are characterized by shape and texture, and the hypothalamus is characterized by shape and spatial location within the brain.
- Real estate marketing: Retrieve all houses that are near a lake (color and texture), have a wooded yard (texture) and are within 100 miles of skiing (mountains are also given by texture).
- Interior design: Retrieve all images of patterned carpets which consist of a specific spatial arrangement of color and texture primitives.

Due to the vast and continuous growth of multimedia information archives, it has become increasingly more difficult to search for specific information. This difficulty is due, at least in part, to a lack of tools to support targeted exploration of audio-visual archives and the absence of a standard method of describing legacy and proprietary holdings. Furthermore, as users' expectation of applications continue to grow in sophistication, the conventional notion of viewing audio-visual data as simply audio, video, or images is changing. The emerging requirement is to integrate multiple modalities into a single presentation where independently coded objects are combined in time and space.

Standards currently exist for describing domain-specific applications. For example, Z39.50 has been widely used for library applications; EDI (Electronic Data Interchange) has been widely used for the supply chain integration and virtual private network. However, both of these standards are essentially adapted for text and/or numeric information. Open GIS (geographical information system) is a standard for providing transparent access to heterogeneous geographical information, remotely sensed data and geoprocessing resources in a networked environment, but it only addresses the metadata. Open GIS has no provisions for storing features and indices associated with features. SMIL (Synchronous Multimedia Integration Language) is a W3C recommended international standard which was developed primarily to respond to that requirement, and the MPEG-4 standardization effort is presently under development to address the same issue. The existence of multiple standards and/or proposals relating to the exchange of various types of information only reinforces the recognition of the need to have a uniform content description framework.

Despite the latest efforts, however, there remains a need, in the field of multimedia content description, for solving a number of outstanding problems, including:

- the lack of a unified means for describing the multiple modalities/multiple fidelities nature of multimedia content,
- the lack of a unified means for describing both spatial and temporal characteristics among multiple objects; and
- the lack of a means for describing both streams and aggregations of multimedia objects.

OBJECTS AND SUMMARY OF THE INVENTION

It is an object of the present invention to provide a a multimedia content description system comprising a unified framework which describes the multiple modalities/multiple fidelities nature of many multimedia objects, including metadata description of the spatial and temporal behavior of the object through space and/or time.

It is another object of the present invention to provide a multimedia content description system comprising a unified framework which describes both spatio and spatiotemporal nature among multiple objects.

It is yet another object of the present invention to provide a multimedia content description system for describing both streams and aggregations of multimedia objects.

It is a further object of the present invention to provide a system comprising information archives employing interoperable capabilities for such functions as query, retrieval, browsing and filtering of multimedia content.

The present invention revolutionizes the access and exchange of varying types/formats of multimedia information between client devices and multimedia storage devices by providing a framework for describing multimedia content and a system in which a plurality of multimedia storage devices employing the content description methods of the present invention can interoperate. In accordance with one form of the present invention, the content description framework is a description scheme (DS) for describing streams or aggregations of multimedia objects, which may comprise audio, images, video, text, time series, and various other modalities. This description scheme can accommodate an essentially limitless number of descriptors in terms of features, semantics or metadata, and facilitate content-based search, index, and retrieval, among other capabilities, for both streamed or aggregated multimedia objects.

The description scheme, in accordance with a preferred embodiment of the present invention, distinguishes between two types of multimedia objects, namely, elementary objects (i.e., terminal objects) and composite objects (i.e., non-terminal objects). Terminal objects are preferably described through an InfoPyramid model to capture the multiple modalities and multiple fidelity nature of the objects. In addition, this representation also captures features, semantics, spatial, temporal, and differing languages as different modalities. Non-terminal objects may include, for example, multiple terminal objects with spatial, temporal, or Boolean relationships, and thus allow the description of spatial layout and temporal relationship between various presentation objects, the appearance, disappearance, forking and merging of objects, etc.

Both terminal and non-terminal objects preferably form the basis for describing streams or aggregations of multimedia objects. In principle, a stream may consist of one or more terminal or non-terminal objects with layout and timing specifications. Consequently, a stream description is preferably defined as a mapping of a collection of inter-object and intra-object description schemes into a serial bit stream. An aggregation, in contrast, preferably consists of a data model/schema, occurrences of the objects, indices, and services that will be provided. Both streaming and aggregation are described within the current framework.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
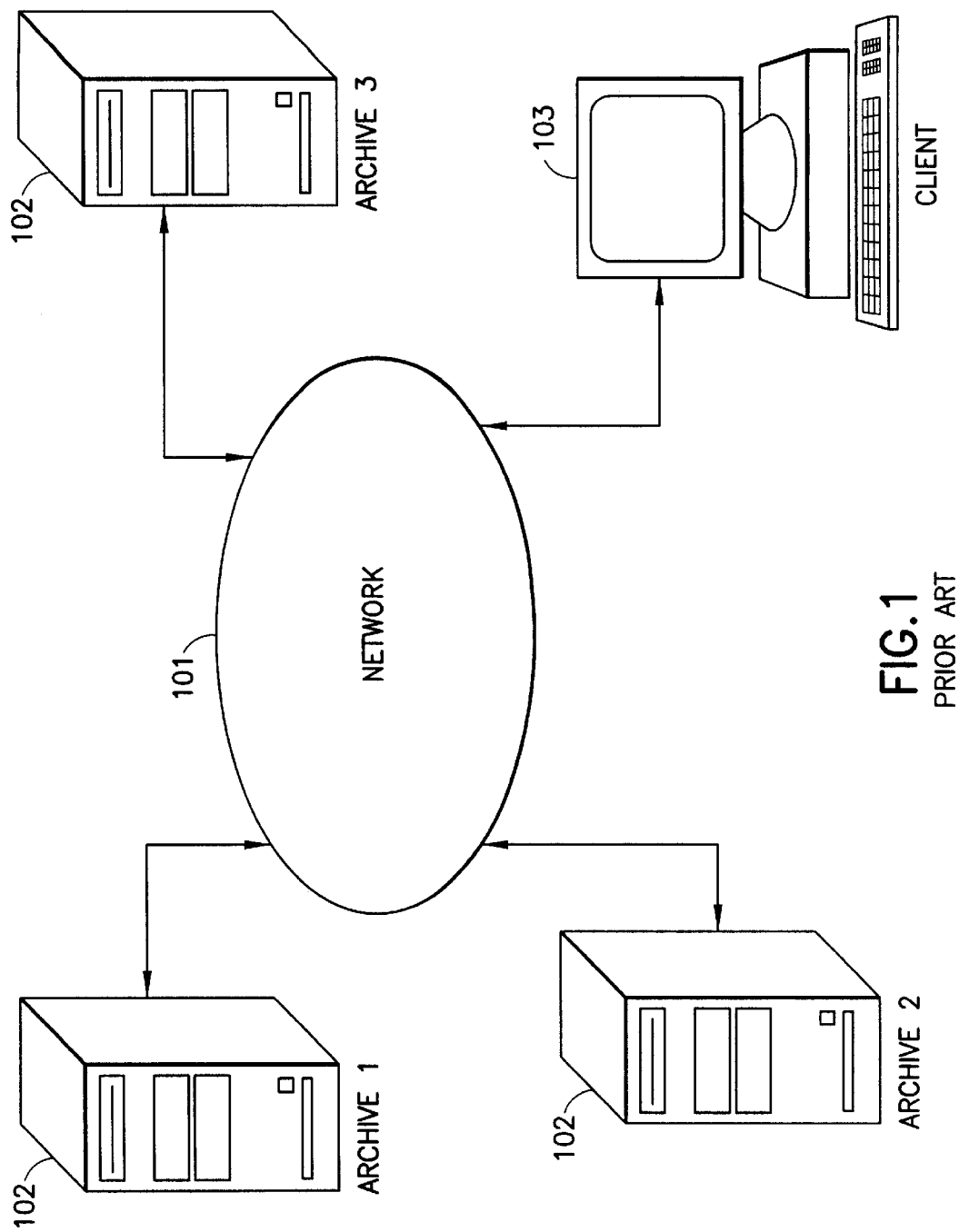
FIG. 1 is a conceptual view of a conventional content description system, illustrating an example of a client connected to a plurality of information archives through a network.

FIG. 1 depicts a conceptual view of a conventional content server environment including one or more information archives or servers 102 and one or more clients 103. The information archives 102 and the clients 103 are typically interconnected through a network 101 for accessing and exchanging data therebetween.

In the content server system of FIG. 1, a client 103 generally initiates a specific request or query. The request or query is then sent to one or more information archives 102. The decision as to which of the one or more archives 102 will receive the client request or query is determined by the client 103 or, in some cases, it may be determined by the network 101. The archive(s) 102 receiving the client request then acts on the request, and may potentially issue its own request to one or more other archives 102. After the client request or query has been serviced, the results are summarized (e.g., by the appropriate servicing archive) and routed to the client 103. Likewise, the client 103 may receive results from multiple archives 102 and summarize the results locally. In the conventional content server environment, it is essential that interoperability exists between the client 103 and an archive 102, as well as between the archives 102 themselves (assuming more than one archive is employed) so that the metadata (i.e., data that describes what is contained in each archive) can be interpreted by all components of the system. Furthermore, interoperability is essential on features (in the image and video archive case), feature indices (if there is a need to access high-dimensional feature space) and semantics.

Figure 2:
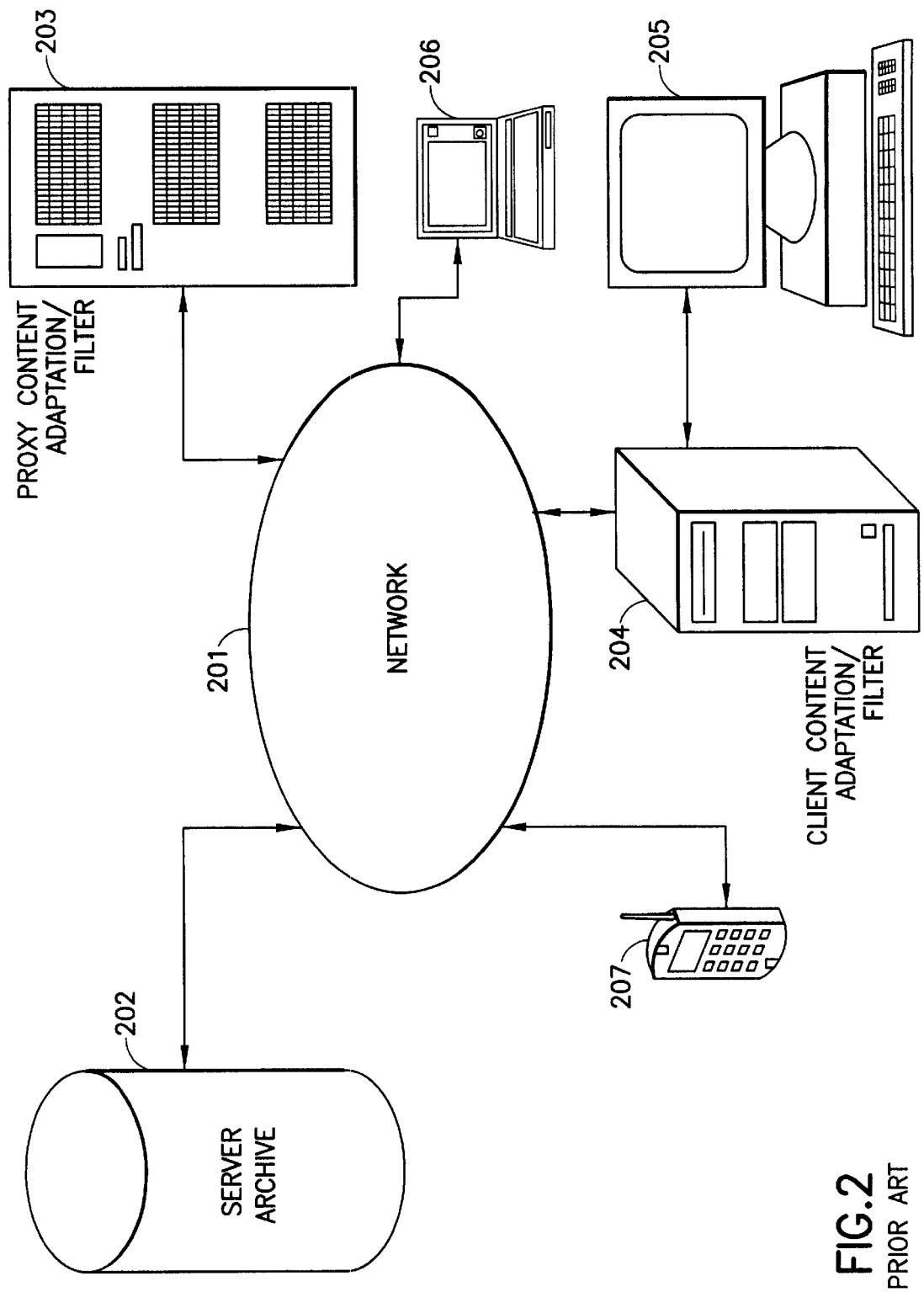
FIG. 2 is a conceptual view of a conventional content description system illustrating different types of client devices connected, through a network, to a collection of different information content sources.

FIG. 2 depicts another conventional content server example, in which the content exchange system contains one or more content server/archives 202 and a variety of client devices, for example, a general purpose computer 205, a laptop computer (not shown) with potentially different bandwidth load, a portable computing system (PCS) 206 and a personal digital assistant (PDA) 207. These devices are interconnected through a network 201, as similarly shown in FIG. 1. In order for the same content to be displayed on different platforms, the content format must first be adapted or converted. This adaptation is necessary since the display and processing capabilities of the various client devices employed with the content server system may differ widely. Content adaptation may take place on the content server 202 prior to being transmitted to the appropriate client device. Similarly, content adaptation may be performed by a proxy 203. Furthermore, content adaptation may be performed by a client content adaptation/filter 204, and the modified content subsequently transmitted to the proper client device(s).

Figure 3:
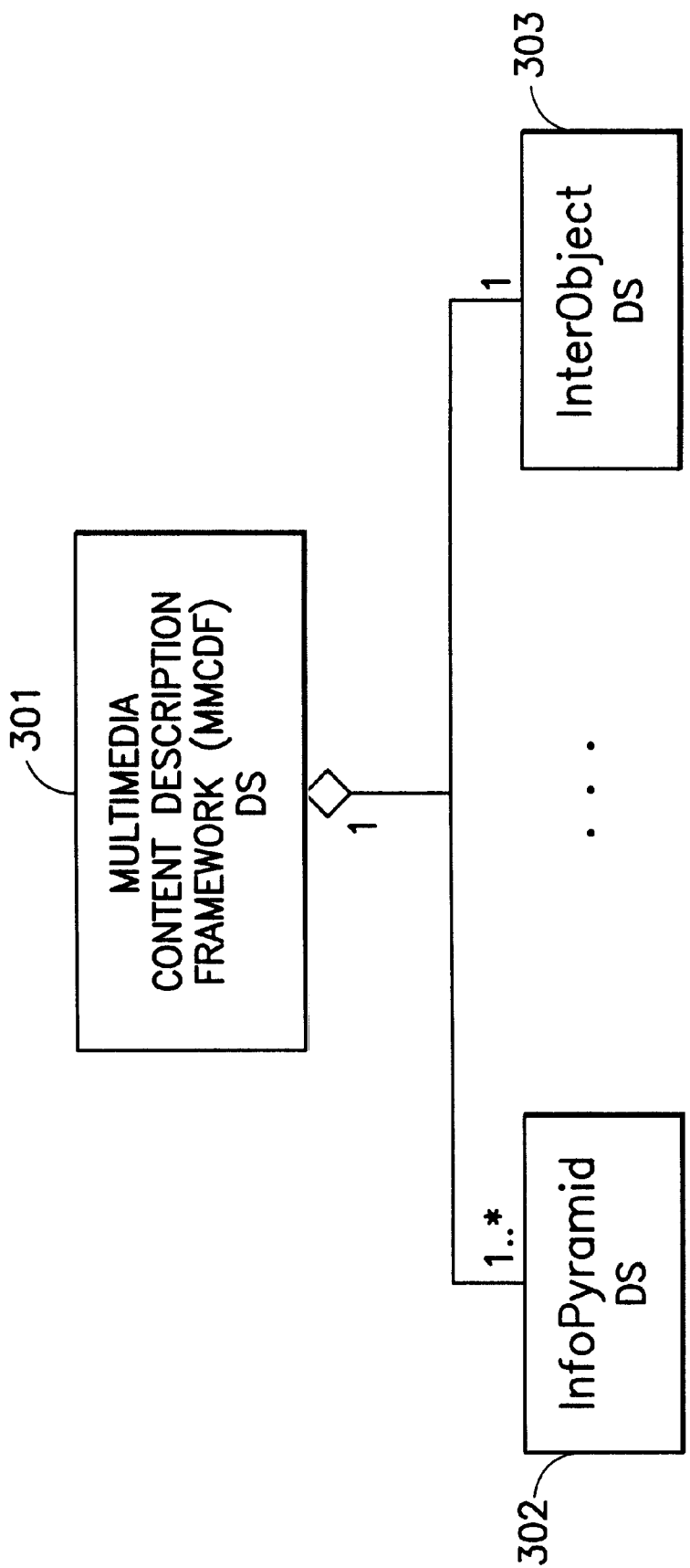
FIG. 3 is a block diagram illustrating a preferred data model or description scheme (DS) for the multimedia content description framework of the present invention, which includes at least one InfoPyramid and one inter-object description model.

In accordance with one embodiment of the present invention, a multimedia content description framework (MMCDF) is provided that solves the problem of describing various types of multimedia information in digital form in terms of either streams or aggregations. With reference to FIG. 3, the MMCDF 301 preferably distinguishes between terminal and nonterminal objects. A terminal object is preferably defined as an elementary object or relationship, which may correspond to a real world object, concept, phenomenon, or other representation. A composite (or nonterminal) object preferably uses one or more terminal objects as building blocks to describe and define more complex objects, relationships, or representations. Furthermore, nonterminal objects preferably use additional spatial, temporal, Boolean rules, or the like to capture the spatial, temporal, Boolean, or other relationships between multiple terminal or nonterminal objects, or any conceivable combination of terminal and non-terminal objects.

Differing information content, and their representative data formats, (e.g., video, images, audio, text, etc.) captured during the same event, or otherwise relating to the same object or expression, may preferably all belong to the same terminal object. It should be appreciated that a given multimedia content source includes one or more terminal objects. By way of example only, consider the following events and corresponding information content: computerized tomography (CT or CAT), magnetic resonance imaging (MRI), ultrasound, and digital x-ray data taken from the same patient during a particular examination may all belong to the same terminal object; Satellite images of a particular location captured by Landsat-Thermic Mappers (TM)/Multispectral Scanners (MSS) (both of which are image acquisition modules on the Landsat platform), Advanced Very High Resolution Radiometer (AVHRR) data, a map relating to the same area, digital elevation map (DEM), and measurement data from weather stations may constitute a terminal object; Core images, seismic survey data and sensory data (such as the Formation Micro Imager (FMI) and other logging data) collected during the drilling of a borehole for gas/oil exploration may belong to the same terminal object.

Preferably, a representation for a terminal object captures substantially all possible modalities (e.g., features, characteristics, semantics, metadata, etc.) that may arise in different applications or events. With continued reference to FIG. 3, in accordance with the present invention, a representation model or description scheme (DS), defined herein as an InfoPyramid 302, is provided for describing:

The data model used in this terminal object (this can be described, for example, by an XML/RDF schema);

Individual modalities, such as images, video, audio, text (potentially in different languages, metadata, features, etc.), with each modality comprising one or more fidelities (e.g., resolution, quality, color, etc.); and Additional modalities, such as the spatial characteristics (e.g., the location/position in (x,y) or (lattitude, longtitude)) and spatio-temporal behavior (e.g., the trajectory) of the object.

Preferably, the multimedia content description framework (MMCDF) of the present invention further provides an Inter Object Specification 303 (IOS) framework or description scheme to describe both spatial and temporal relationships among multimedia objects, as well as to specify inter-object user interactions. This framework 303 allows the specification of the semantics and syntax for combining media objects into composite objects (or nonterminal objects). A detailed discussion of the IOS 303 and InfoPyramid 302 representations are provided herein below with reference to FIGS. 3 and 4.

InfoPyramid for Intra-Object Specification

Figure 4:
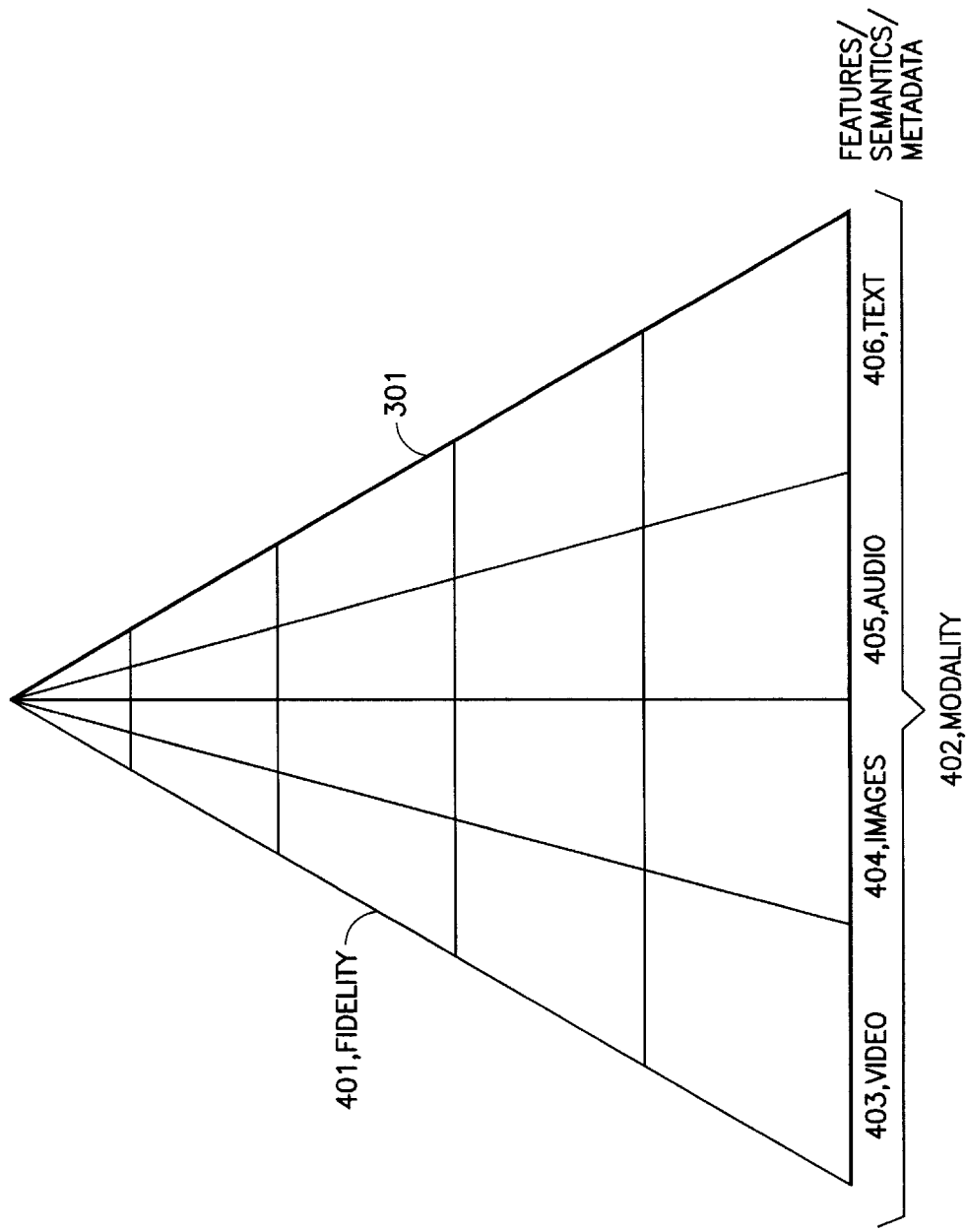
FIG. 4 is a graphical representation illustrating a basic InfoPyramid data model for representing multimedia information, formed in accordance with one embodiment of the present invention.

Multimedia content typically does not exist as a single, homogeneous media format or modality. Consider, for example, that a video clip may include raw data from a video source, as well as audio (possibly in multiple languages) and closed captions. As a further example, consider a medical environment, wherein MRI, CT, PET, and ultrasound information can be collected for the same patient, thus resulting in multiple three-dimensional (3D) scans of the same or similar content. Consequently, each terminal object in the multimedia content description framework (MMCDF) of the present invention is preferably defined by a data structure InfoPyramid 302, a preferred embodiment of which is detailed in FIG. 4. As shown in FIG. 4, the InfoPyramid describes content in different modalities 402 (e.g., video 403, audio 405, text 406, etc.) and at different fidelities 401. Preferably, the highest resolution/fidelity level is represented along the base of the pyramid, with the lowest level of resolution/quality being represented at the top of the InfoPyramid model. Furthermore, the InfoPyramid of the present invention preferably defines methods and/or criteria for generating, manipulating, transcoding and otherwise transforming the source multimedia content as desired, or as suitable for a particular target platform, device, or class of devices.

As mentioned above, in addition to being comprised of multiple modalities, each content component may also be described at multiple fidelities. Here, fidelity may refer not to the format of the information, but rather to the appearance or quality of the information. For example, fidelity may include the resolution, number of colors, sharpness, frame size, speed, etc. of video/image content; the audio quality (sampling rate), pitch, etc. of audio content; or the language, font style, color, size, summarization, etc. of text content, as appreciated by those skilled in the art. Numerous resolution reduction techniques are known by those skilled in the art for constructing image and video pyramids. For example, Flashpix is a commercially available application which provides mechanisms for storage and retrieval of still images at multiple resolutions. Likewise, features and semantics at different resolutions are preferably obtained from raw data or transformed data at different resolutions, thus resulting in a feature or semantics pyramid.

Preferably, each device or class of devices can be represented by a different InfoPyramid. Alternatively, an InfoPyramid may be used to describe all of the modalities and fidelities required by a particular multimedia system. As an example, consider a personal data assistant (PDA), wearable on a user's wrist which includes an LCD capable of displaying only text or very low resolution images. In accordance with the multimedia content description framework (MMCDF) of the present invention, an InfoPyramid model representing this PDA device may include only text and image modalities and relatively few fidelity levels. An InfoPyramid representation of the multimedia source would then preferably be transformed into the InfoPyramid representation of the target device, using known transformation schemes, prior to displaying the multimedia information on the target device. It is to be appreciated that the present invention contemplates that such content transformation may take place either at the multimedia source, at the target device, or at any suitable point therebetween.

Occaisonally, an appropriate multimedia content modality may not exist to appropriately describe the multimedia content. In some cases, the required modality may be synthesized by transforming and/or combining other existing modalities and/or fidelities until the desired content is adequately described. For example, a video clip may be transformed into images showing key frames. Likewise, text can be synthesized into speech, and vice versa. Furthermore, since the content description framework of the present invention is recursive, multiple transformations may be performed within the same non-terminal object, either between two or more different modalities, or between two or more different fidelities, or a combination thereof.

Figure 8:
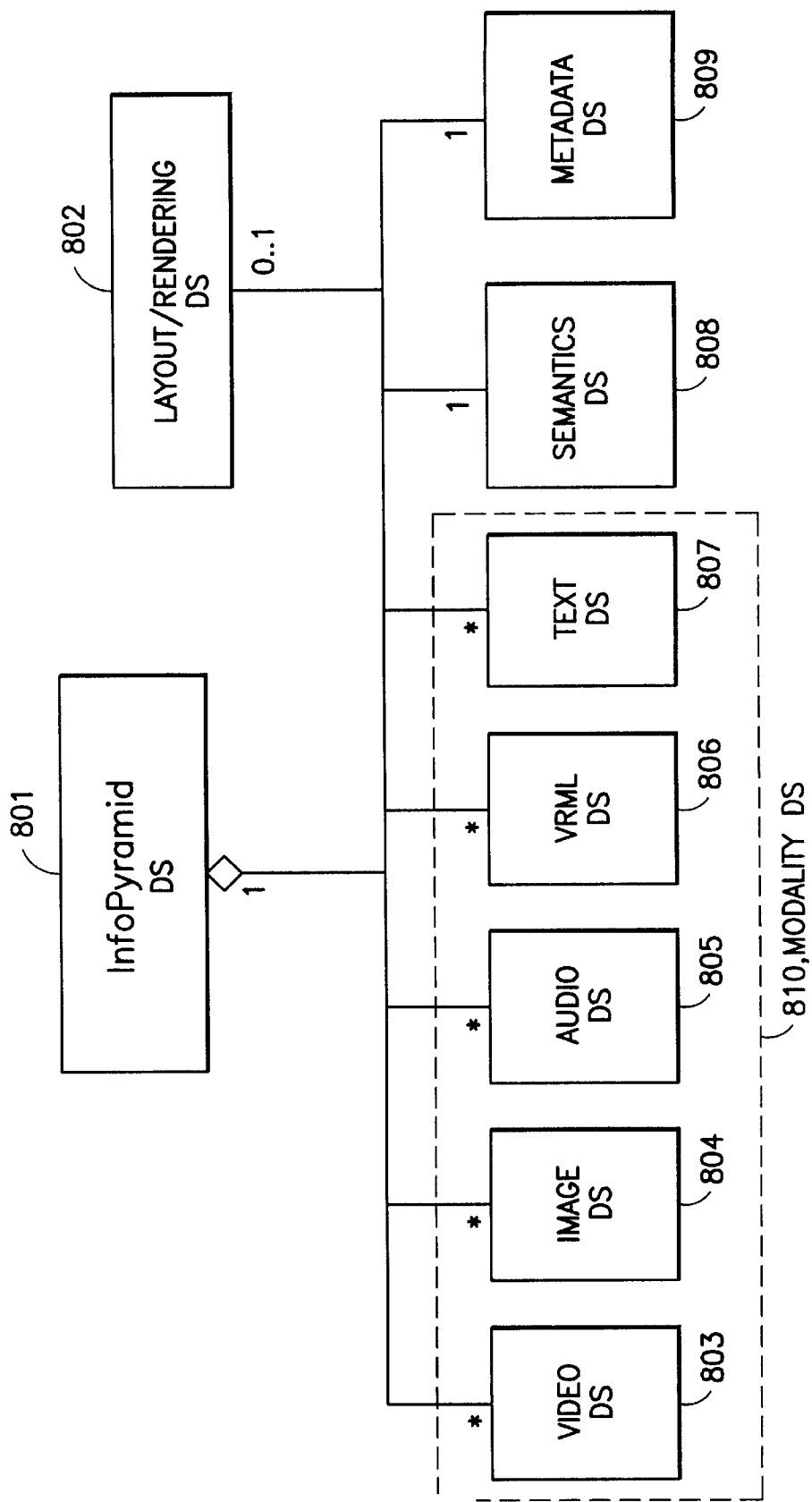
FIG. 8 is a block diagram illustrating a preferred data model or description scheme (DS) for the Infopyramid, formed in accordance with the present invention.

With reference to the InfoPyramid example of FIG. 4, possible modalities 402 may include, but are not limited to, text 406, images 404, audio 405 and video 403. A preferred embodiment of the InfoPyramid data model is shown in FIG. 8, and preferably includes two broad categories of data, namely, non-structured data and semi-structured data, as discussed in more detail herein below. It should be appreciated, however, that additional categories or types of data may be represented by the content description framework of the present invention in a similar manner.

Non-structured and Semi-structured Data

Text description scheme (DS) 807: This modality is preferably the free text or structured text description (using HTML or XML, for example) within an object. Note, that an object may contain text in different languages, and each language will preferably constitute a different modality.

Image DS 804: Images are generally RGB or multispectral, such as those acquired from satellite images, although virtually any image format may be described according to the present invention. There may exist multiple image modalities, depending on the application. Images may be stored as raw data or in a transformed format (e.g., blocked DCT as used in JPEG).

Audio DS 805: This modality preferably captures audio information, including speech, natural sounds, music and the like.

Video DS 803: This modality preferably captures video and visual information

Feature Descriptors: These modalities preferably include textures, color histograms, shapes, from both still images and video, as well as motion derived from video. Note that features can be derived from either the raw data or the transformed data.

Semantics and object DS 808: Typical semantics and object descriptions may include, for example, houses/trees from a still image, an anchorwoman from news video clips, and forest from satellite images. These semantics and object descriptions can be either automatically or manually derived from features, raw data, transformed data, or the like.

Annotations, metadata, and additional DS 809: These modalities preferably provide global descriptions of the content, including, for example, the author/publisher, date, location of event, etc.

Spatial-temporal behavior DS 802: This modality preferably describes spatial characteristics of an object or event as a function of some other measurable quantity or relationship, such as time or distance (e.g., size as a function of time, or location as function of time).

Temporal behavior DS 802: This modality preferably describes the temporal behavior of non-spatial characteristics, such as, for example, intensity as a function of time.

Also shown in FIG. 8 are Info Pyramid DS 801 and VRML DS 806.

Structured Data

Structured data preferably describes the structure/organization of an object or other entity and may include generic tables, relational tables, and spreadsheets (e.g., Excel, Lotus 1-2-3, etc.), among other suitable representations. For example, the structured data description may describe the structure of a table, such as the attributes of the columns, and the data distribution of each column.

It should be appreciated that, in accordance with the present invention, additional modalities may be added as necessary. For example, it may be desirable to describe an object in both the English and French languages, each of which may occupy a modality. Some of the modalities are more suitable for indexing purposes rather than for browsing purposes, such as a features modality. This preferred decomposition of multimedia content description allows better flexibility of index and retrieval of object(s) and composite objects at multiple abstraction levels. Each of these modalities can be represented at multiple resolutions or fidelity levels. While the concept of multiple resolutions for images and video based on various pyramidal coding is well known by those skilled in the art, this concept has not been applied to text and other modalities.

In accordance with a preferred embodiment of the present invention, the spatial or temporal location of a particular feature or semantics preferably inherits the location of the data, transformed data, or features that this feature or semantics is derived from. Neighboring features (both spatially and temporally) that are "similar" are preferably grouped together to form a region. A region can be defined by its minimum bounding box, a polygon, a quadtree, or any other suitable representation known in the art. The location of this representation is preferably inherited from the features before grouping; Similarly, neighboring semantics (both spatially and temporally) that are "similar" are preferably grouped together to form a region. Similar techniques used to represent features can be adopted here to represent the location of an object, event, etc.

In one multimedia application relating to the Motion Picture Experts Group (MPEG) data compression standard, for example, a main difference between the InfoPyramid approach of the present invention and other conventional schemes proposed for MPEG-7, is the virtually complete elimination of the dichotomy between data and metadata. In practice, it has become harder to distinguish between transformed data and features. For instance, wavelet coefficients, such as those based on quadrature mirror filters and Gabor filters, have been used for both transformations as well as feature extractions. Consequently, a data model that can accommodate both data and metadata in a seamless fashion is extremely desirable. InfoPyramid accommodates both raw data and transformed data as one of the modalities, thus eliminating possible asymmetry introduced by restricting the data model to only metadata.

One of the primary challenges faced by a content description framework that is capable of processing multimedia information comprised of various modalities and/or fidelities is the synchronization of feature and semantics descriptions among the different modalities and/or different fidelities. These challenges have been solved by the present invention which, in a preferred embodiment, provides, among other things, a modality dependency entity-relationship, preferably generated for each of the original modalities and resolutions/fidelities (except metadata), and stored as part of the description scheme. An example of a modality dependency entity description is illustrated in FIG. 9.

Figure 9:
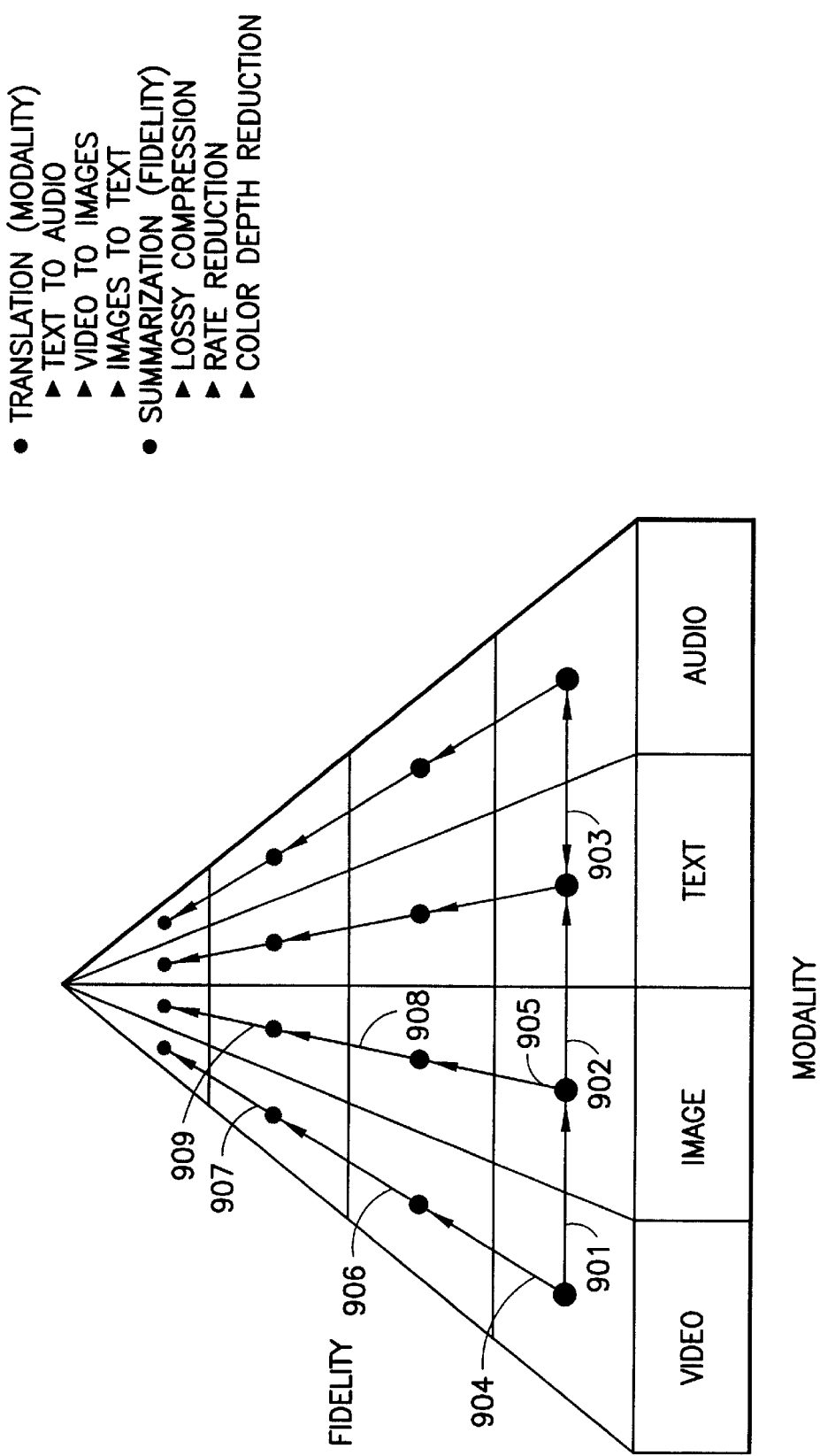
FIG. 9 is a graphical representation of the Infopyramid of FIG. 3, illustrating an example of feasible modality translations and fidelity summarizations within the InfoPyramid framework, according to the present invention.

With reference to FIG. 9, for each modality of the multimedia content, the original modality at the original resolution is preferably selected as a root entity in the description. When either a different modality or a different fidelity/resolution is derived from the existing modality and/or resolution, the new modality and/or resolution is defined as the child of the original modality or resolution (with the original modality or fidelity preferably being referred to as the parent) and is preferably recorded on the modality dependency entity description.

Preferably, each connection between adjacent nodes (i.e., modalities and/or fidelities) corresponds to a transformation, either between two different modalities (i.e., horizontal transformation), or between two different fidelities (i.e., vertical transformation). It should be appreciated that diagonal transformations may be derived from a combination of horizontal or vertical transformations using the InfoPyramid model. A new entity may preferably be derived using one or more of these transformations according to predetermined rules corresponding to each connection on the modality dependency entity description. Alternatively, the present invention similarly contemplates the use of diagonal transformations (i.e., a transformation between two modalities and two fidelities), or any other conceivable translation/transformation known by those skilled in the art. The method and/or rule that is used to derive the new entity is also preferably recorded as part of the relationship. This process is preferably repeated for every original modality and/or fidelity in the multimedia content.

As discussed above, there are essentially two types of method/rules which may be utilized by the present invention to derive a new entity:

Modality Translation (e.g., 901, 902, 903): This transformation includes, for example, text to audio, video to images (using keyframe extraction), image to text (using image recognition techniques or annotations by a human being), etc.; and Fidelity transformation (e.g., 904–909): This transformation includes, for example, lossy compression of images, audio and video, rate reduction, color depth reduction, and text summarization. Techniques are also known by those skilled in the art to summarize videos through the extraction of a storyboard, or the construction of a scene transition diagram.

It should be appreciated that the example transformations described above are furnished only to illustrate preferred modality-fidelity transformation rules, and are not intended to limit the scope or application of the present invention. Other transformation schemes may also be employed with the present invention.

Figure 11:
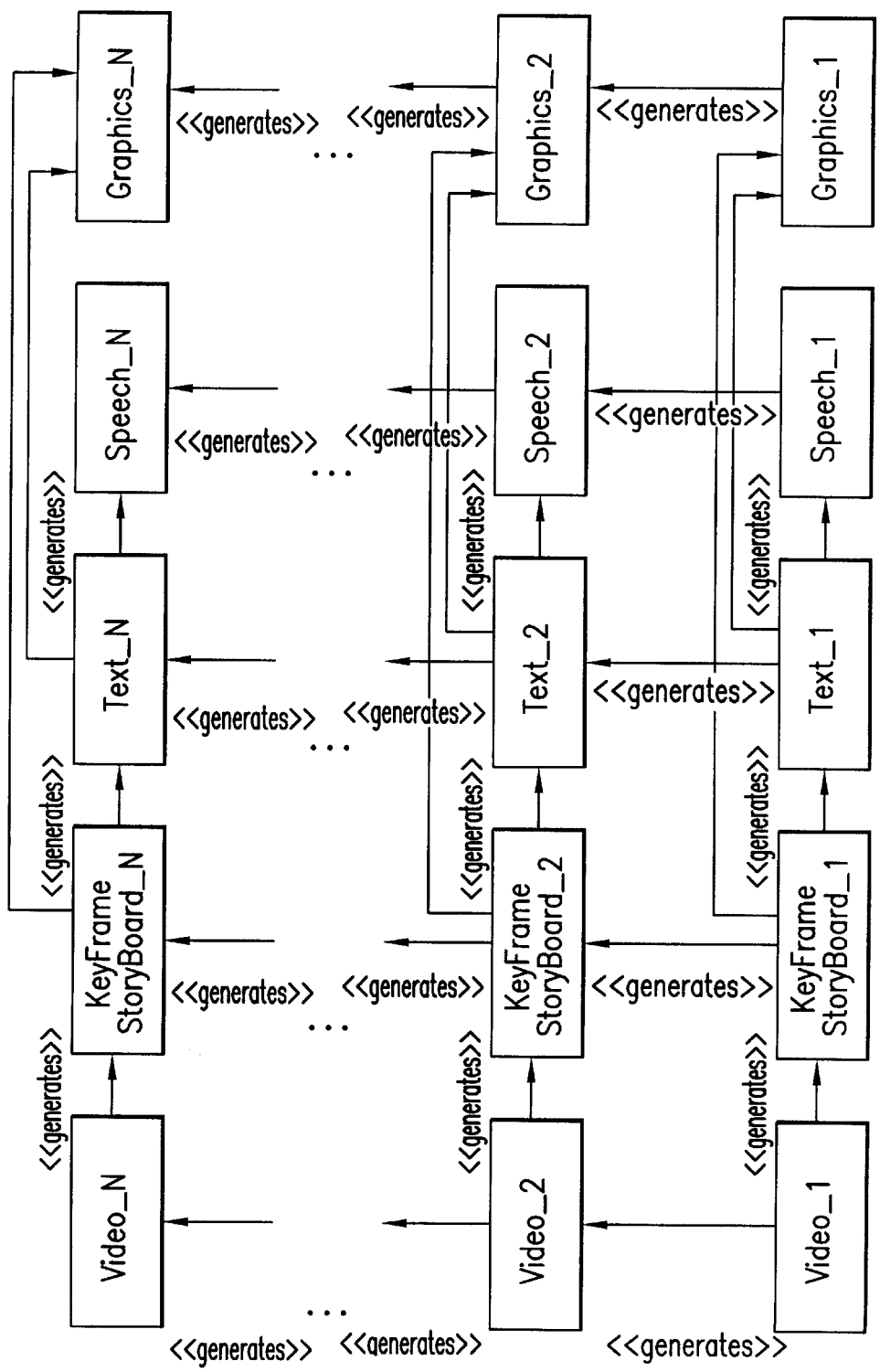
FIG. 11 is a flow diagram illustrating an example of a modality dependency graph of a video clip, in accordance with one form of the present invention.

By way of example only, FIG. 11 illustrates one method, wherein a video modality can be converted into Key Frame or Story Board modality, which can then be converted to a text modality, and possibly converted to a speech modality. For each of these modalities, different levels of detail (or fidelity) can be represented. Many of these conversions are preferably done automatically, and thus the <<generate>> action in the dependency graph will preferably capture and record the method that is used to transform from one modality to another (or one fidelity to another). These conversions may also be done manually, in which case the <<generate>> phrase preferably only illustrates the dependency of the data entities. Note that both key frame and text can be converted to graphics. Converting images to graphics typically involves the extraction of edges from the images. By using an iconic vocabulary, it is also possible to convert text, text phrases, text sentences and the like to graphics.

Figure 12:
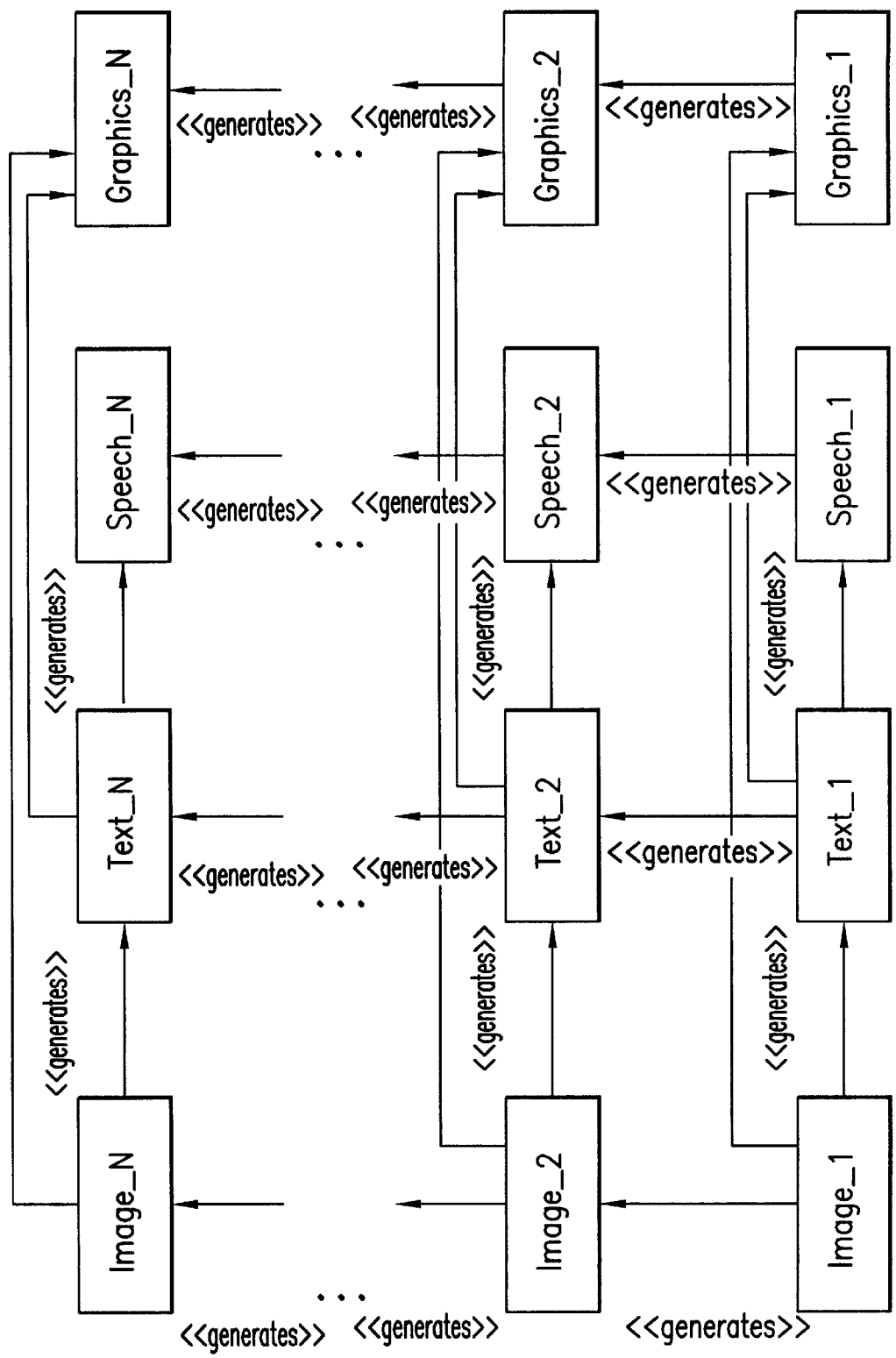
FIG. 12 is a flow diagram illustrating an example of a modality dependency graph of an image, in accordance with one form of the present invention.

FIG. 12 illustrates an example of multimedia content wherein an original modality is an image. Text descriptions can be generated, in accordance with the present invention, for the images in terms of the objects inside the image as well as the metadata of the image. These text descriptions can then be converted to speech using transformation rules known in the art. Both the image and text representations can be converted to graphics, which captures the "essence" of the image, again using any known transformation techniques. For each of these derived modalities, multiple fidelities may exist.

Figure 13:
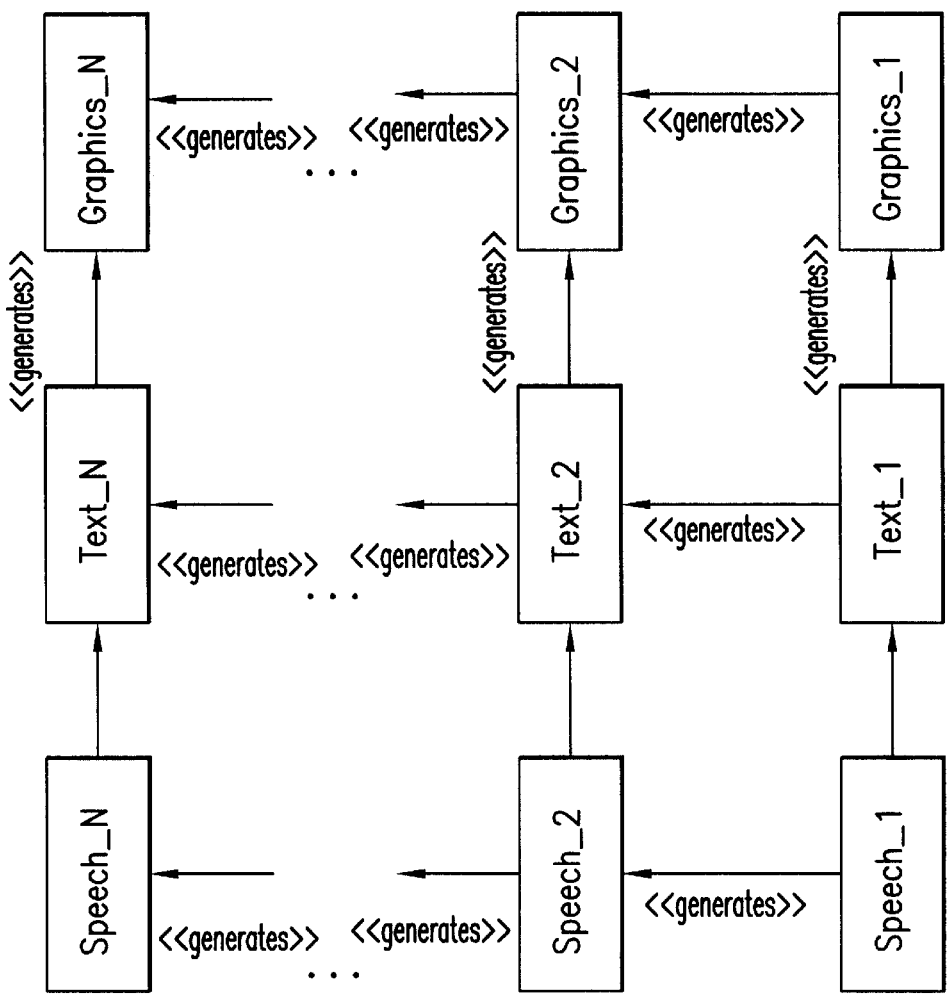
FIG. 13 is a flow diagram illustrating an example of a modality dependency graph of a speech clip, in accordance with one form of the present invention.

FIG. 13 illustrates an example of the multimedia content wherein an original modality is speech. Speech can be converted to text through speech recognition actions, as appreciated by those skilled in the art. The text can then be converted to graphics (such as animated cartoons, etc.) using known transformation rules/methods. As in any of the modality transformation examples, each modality can include multiple fidelities.

Figure 14:
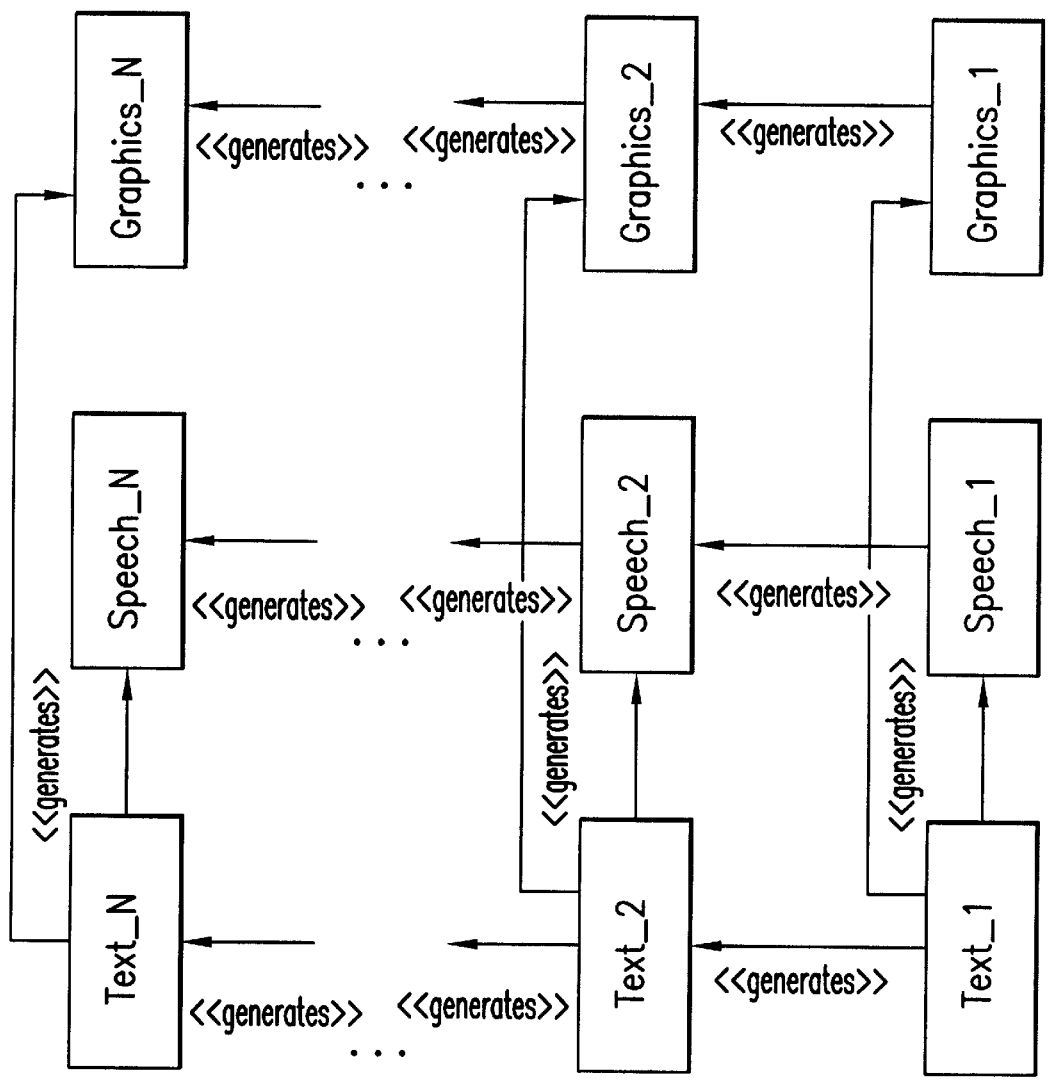
FIG. 14 is a flow diagram illustrating an example of a modality dependency graph of a text document, in accordance with one form of the present invention.

FIG. 14 illustrates an example of multimedia content wherein the original modality is text. Text can be converted to speech through text-to-speech synthesis, among other suitable methods known to those skilled in the art. Text can also be converted to graphics (e.g., cartoon). Similar to previous examples, each of the modalities can also include multiple fidelities.

Figure 15:
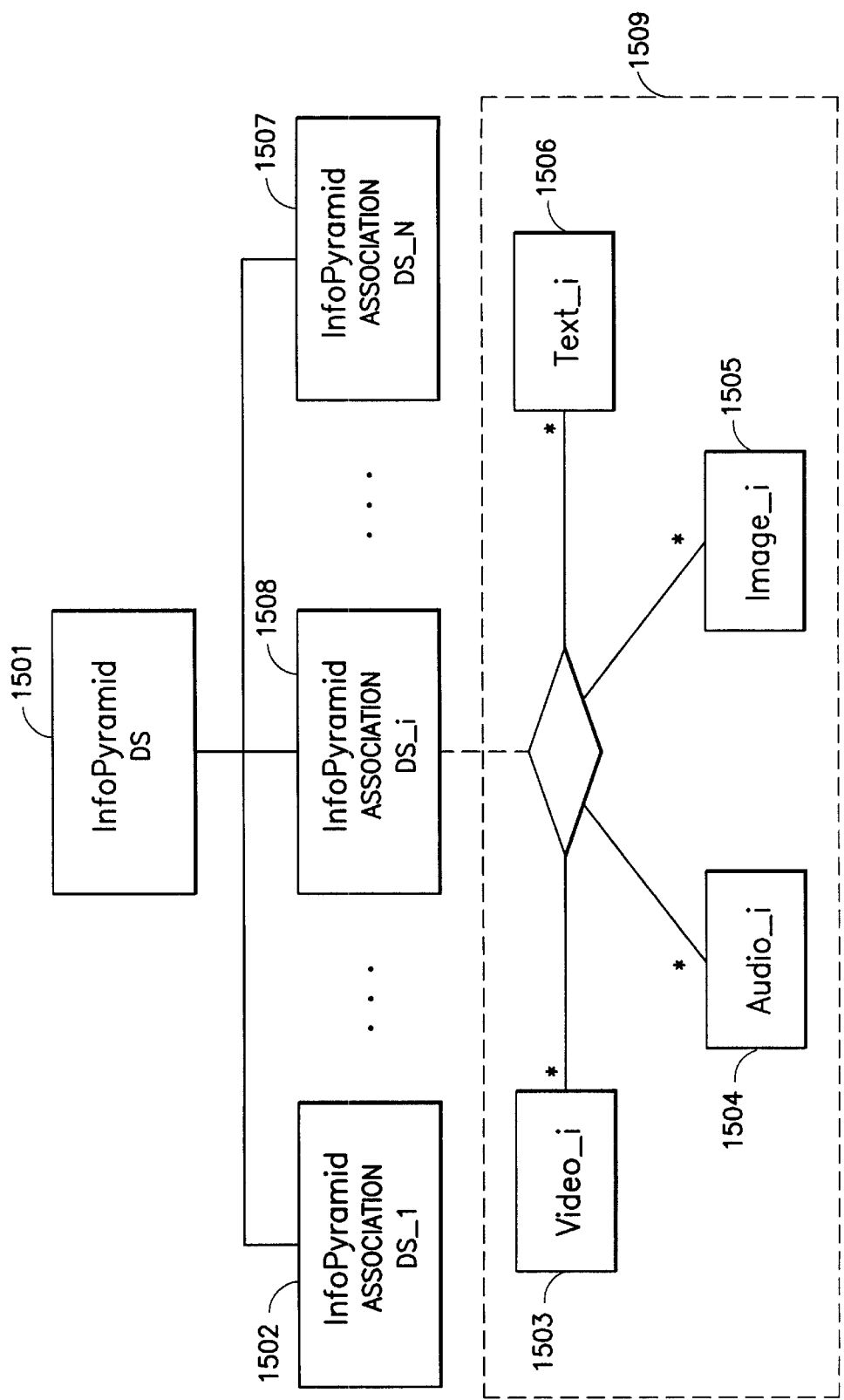
FIG. 15 is a block diagram depicting a full data model of a multi-modal InfoPyramid, which may include one or more InfoPyramid association objects, each object comprising one or more modalities.

With reference now to FIG. 15, a preferred data model of a multimodal InfoPyramid, in accordance with the present invention, is depicted. Preferably, in addition to the modality dependency entity relationship, a modality association entity-relationship 1502, 1507, 1508 exists in the InfoPyramid data model to describe the association of a subset of the modalities at a given resolution (or fidelity). Each association is preferably a collection of the modalities that are individually suitable to be presented (i.e., displayed) on a target platform (e.g., for a given device or range of devices, a given bandwidth or range of bandwidths, a given user interest or range of user interests). The baseline association 1509 constitutes the original collection of modalities for the multimedia document. These modalities can include, for example, as shown in FIG. 15; Video-i 1503, Audio-i 1504, Image-i 1505, and Text-i 1506. Also shown in FIG. 15 is Info-Pyramid DS 1501. Additional associations may represent collections of modalities that can be progressively retrieved, or that are suitable for presentation when the bandwidth is insufficient, or when the platform imposes severe constraints on multimedia content presentation (e.g., Palm, PDA devices, screen phones, etc.). Contextual information for each association is preferably recorded in the modality association relationship.

It is to be appreciated that object descriptions from different modalities can be associated, and the descriptions of these associations similarly stored in the InfoPyramid association DS. As an example, consider the case where object 1 in an image description refers to object 2 in a video description, and object 3 in a text description occurs before object 4 in a video description. These associations can assist the transcoding process when the right set of modalities must be selected.

Figure 16:
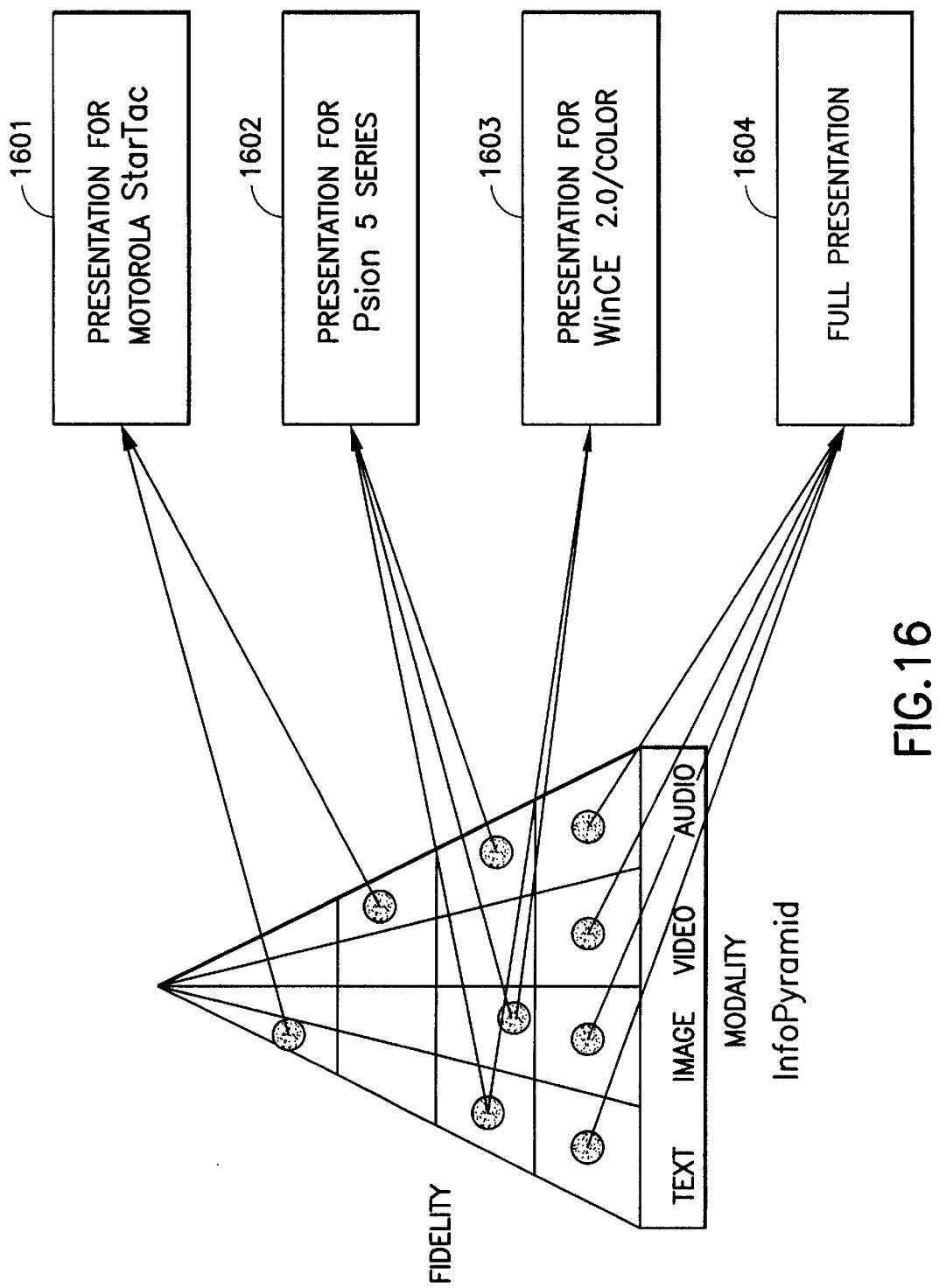
FIG. 16 is a graphical view illustrating an example of possible predetermined modality and fidelity associations for various known devices or device categories, in accordance with one form of the present invention.

In FIG. 16, examples of various predetermined associations, as represented on the InfoPyramid model of the present invention, are shown for some popular multimedia platforms or devices. It should be appreciated, however, that the present invention is not limited to those precise embodiments shown in FIG. 16. With reference to FIG. 16, a presentation for a Motorola StarTac™ device 1601, for example, may include a text modality at the lowest fidelity level and an audio modality at a slightly higher fidelity. Similarly, a presentation for a Psion™ device 1602, may include text, image, and audio modalities at even higher fidelities; A presentation for color WinCE devices 1603, may include just text and image modalities at the same fidelity as for a Psion™ device. Accordingly, a full presentation 1604 for a general purpose personal computer (PC) connected at full network bandwidth, for example, will preferably include all modalities (e.g., text, image, audio, and video) at the highest possible fidelities supported by the multimedia content source.

Since it is virtually impossible to predict new types/formats of data or the countless applications using such data which may arise, an important aspect of the present invention is its ability to dynamically extend the multimedia content description framework to accommodate such new content as it is encountered. In accordance with the present invention, content descriptions are preferably defined from an extensible set of description data types. The descriptor schemes are preferably defined by specifying sets of content descriptors and methods to facilitate indexing, searching and comparing instances of the content. A more detailed discussion of description data types is provided herein below.

Description Data Types

In accordance with the present invention, the multimedia content descriptors are preferably defined from fundamental description data types and/or user-derived data types. The multimedia content description system of the present invention preferably provides a fundamental set of primitives and extended data types. In applications, the content descriptors are defined as instances of these fundamental data types. Furthermore, the multimedia content description system of the present invention preferably provides the mechanism for the user to derive new data types by extending the fundamental data types.

As an example, a preferred fundamental set of primitives may include binary, integer, real, element, set, relationship, etc. Similarly, an example of extended description data types of the multimedia content description system may include array, vector, histogram, point, line, path, rectangle, polygon, shape, sequence, character, term, text, concept, composite, dictionary, thesaurus, ontology, and others as may be defined by the user.

In creating content description instances, many of the data types, T, preferably utilize modifiers, for example, of the form T(t)[1], which may specify that T contains 1 element of type t. As another example, in accordance with the present invention, an n-dimensional vector in integer space may be represented as vector(integer)[n]. Each description data type preferably contains methods to construct, compare, and destroy description objects of that data type.

Derived data types, D, are preferably derived from fundamental data types. For example, a derived type D which is derived from type T may preferably be defined as D:[T]. In general, derived data types are often most useful when combining fundamental data types as, for example, D:[T1, T2, T3, . . . ], where D is the data type derived from fundamental data types T1, T2, T3, etc. For example, consider the following definition of the derived data type "deformation":

deformation:[sequence(shape)[N],path]

In this definition, the derived data type deformation, is preferably derived from a sequence of shape transformations specified by "sequence(shape)[N]", as well as a translation through a path specified by "path".

Standard Descriptors

In accordance with a preferred embodiment of the present invention, a set of standard descriptors have been developed for images and videos across several search and retrieval applications. These descriptors preferably describe various visual features, such as color, texture motion, etc. For example, 166-bin color histograms derived from HVS color space may preferably be defined as:

HVShist:histogram(real)[166]

Two descriptors are preferably utilized for texture. By way of example only, consider the descriptors QMFtexture:vector(real)[9]; and conglomtexture:vector(real)[20], where QMPtexture is preferably defined by the spatial-frequency energies on 9 subbands of the QMF wavelet transform of the image and conglomtexture is preferably defined from a conglomeration of 20 texture features which are suitable for querying-by-texture of satellite imagery.

Description Functions

The content description system of the present invention preferably defines a fundamental set of description functions which operate on the description. At least one primary purpose of the description functions is to facilitate the comparison of description values, which enables searching, indexing, retrieval, among other contemplated functions, of the source multimedia content.

The fundamental description functions preferably comprise several classes, such as logic, similarity and transform functions, among others. Fundamental logic functions contemplated by the present invention may include, for example, "equals", "not equals", "greater-than", "less-than", "and", "or", "not", etc. as known by those skilled in the art. The logic functions preferably perform binary operations, although the present invention similarly contemplates other suitable types of logical operations. The similarity functions, on the other hand, preferably return a score. Suitable fundamental similarity functions for use with the present invention include, for example, "walk", "Euclidean", "chessboard", "quadratic", "hamming", and others known by those skilled in the art, which define standard mathematical formulas for computing distances.

As can be appreciated by those skilled in the art, transform functions essentially define operations on the description which transform it in some way. For example, transform functions can define the relationship between one description type and another standard description type. For example, consider the standard description type rgbhist:histogram(integer)[512]

Given this descriptor, which preferably defines rgbhist as a 512-bin histogram in RGB color space, another derived description type may be declared, such as myhist:histogram(integer)[512], which may define a color histogram in a different color space. Assuming the new color space is derived from the RGB color space, then myhist may be obtained via a transformation, F, of rgbhist, which may be represented as myhist=F(rgbhist).

Figure 19:
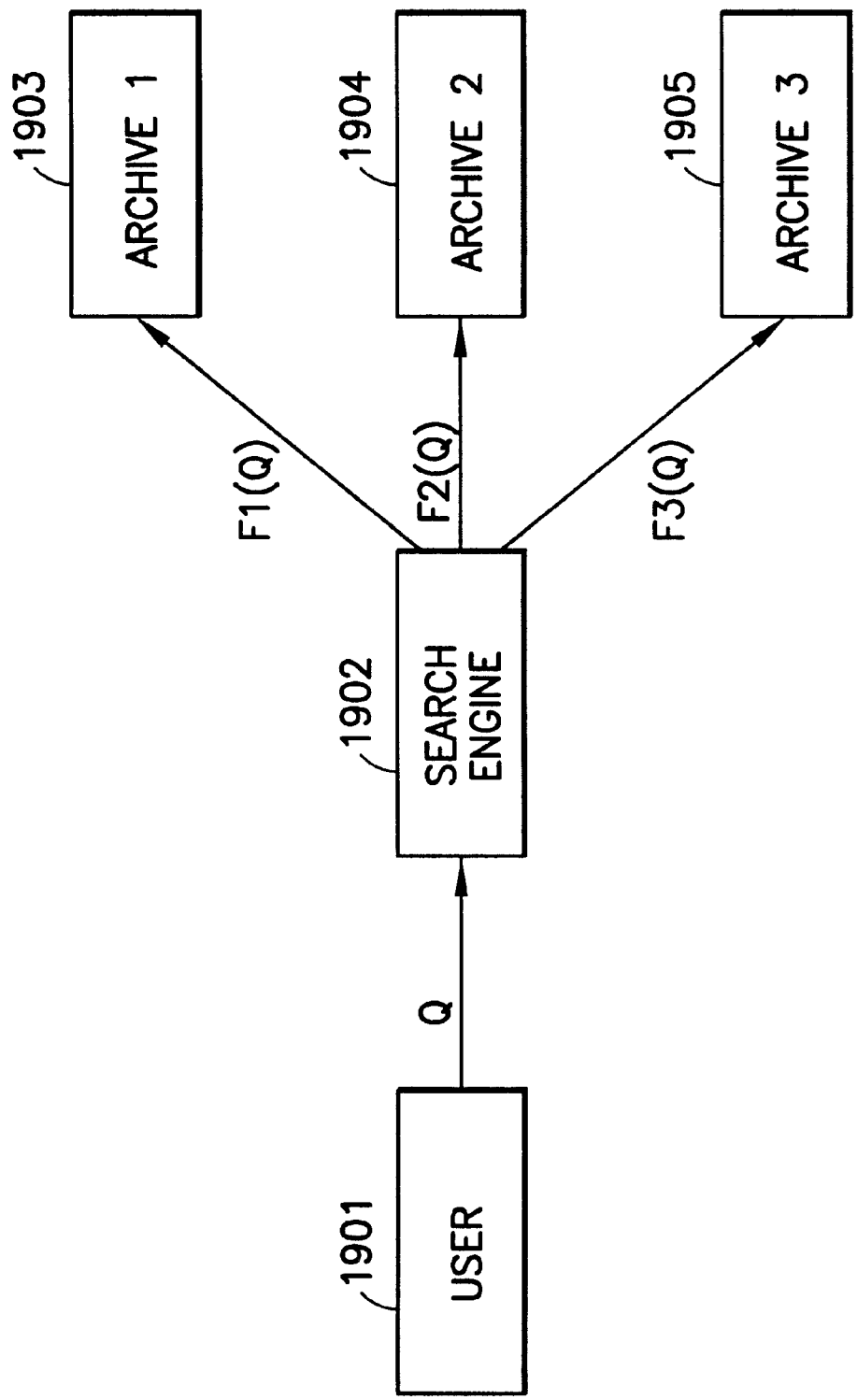
FIG. 19 is a flow diagram illustrating an example wherein a search engine transforms a user query into a plurality of different queries, each query satisfying the constraints of a corresponding multimedia source, in accordance with one form of the present invention.

One skilled in the art can appreciate the importance of the above transformations in conducting queries across multiple archives of multimedia content, as illustrated in FIG. 19. For example, as illustrated in FIG. 19, each archive 1903, 1904, 1905 may utilize a different color histogram description. In order for the search engine to query the multiple archives given a single query color histogram Q (preferably generated by a user 1901), the search engine 1902 must transform that query histogram Q into the appropriate histogram color spaces of the particular archives 1903, 1904, 1905 (i.e., F1(Q), F2(Q), and F3(Q), respectively). Content-based searching across multiple archives requires transformations of the query histogram Q to be compatible with the specific content descriptions in each archive.

Extensible Markup Language (XML) Representation

With reference again to the MPEG-7 example, it is preferable that a representation for MPEG-7 data, or the InfoPyramid data abstractions, be at least readable, portable, standard and extensible. Accordingly, XML is preferable for use with the present invention as the basis of the representation language (InfoPyramid Description Language or IPDL) for InfoPyramids, although the present invention contemplates using any suitable equivalent language. As appreciated by those skilled in the art, XML is a tagged markup language for representing hierarchical, structured data. XML is, by definition, extensible and has the advantages of being portable (It is essentially independent of the underlying machine, operating system/platform, programming language, etc.) and is easily readable by both machines and humans.

In addition to the above features, XML has a strong linking model. This feature of XML is useful for specifying and maintaining relationships between different modalities and versions, etc., of content. This linking mechanism also makes the representation independent of the underlying storage medium. For example, videos may reside on a video server, text transcript may reside in flat files for a text index and metadata may reside in a relational database. The linking mechanism of XML will make such storage transparent.

Descriptor Extensibility

New descriptors can be defined in XML by specifying the base class types and compare methods. As an example, consider the following specification of a new color histogram description class:

<IPMCD classname="myhist" baseclass="histogram (real)[64]" compare="Euclidean" owner="address" spec="address"> </IPMCD>, which defines the descriptor class "myhist" which corresponds to a 64-bin histogram which utilizes the Euclidean distance metric to compare myhist descriptions. The myhist content description instances may be specified as:

<IPMCD id=999999 myhist="83203411242342342 . . . "> </IPMCD>

Descriptor Schemes

The multimedia content description language preferably enables the development of descriptor schemes in which a set of content descriptors and their relationships are specified. For illustration purposes only, consider the following example:

<IPMCD classname="colorregion" baseclass="myhist, shape"

compare="0.6*myhist.Euclidean+0.4*shape.walk"> </IPMCD>

<IPMCD classname="regionset" baseclass="set (colorregion)[N]"

compare="sum(n=0;N−1)(colorregion.compare)"> </IPMCD>

The domain of MPEG-7 descriptors is very large. An investigation of early proposals for MPEG-7 show that a large number of features and metadata have already been suggested, and this list is only growing to increase. Most of these are specific to particular media objects or application domain. XML includes an excellent mechanism, the Document Type Definition or DTDs which make it possible to manage the plethora of meta-data and feature descriptors by DTDs which support the subset for a particular media or application. The DTDs also makes it easy for a particular community (say Satellite Imagery vs. News videos) to share and conform to a specific set of MPEG7 descriptors by subscribing to a common set of DTDs.

Inter Object Specification (IOS)

Figure 10:
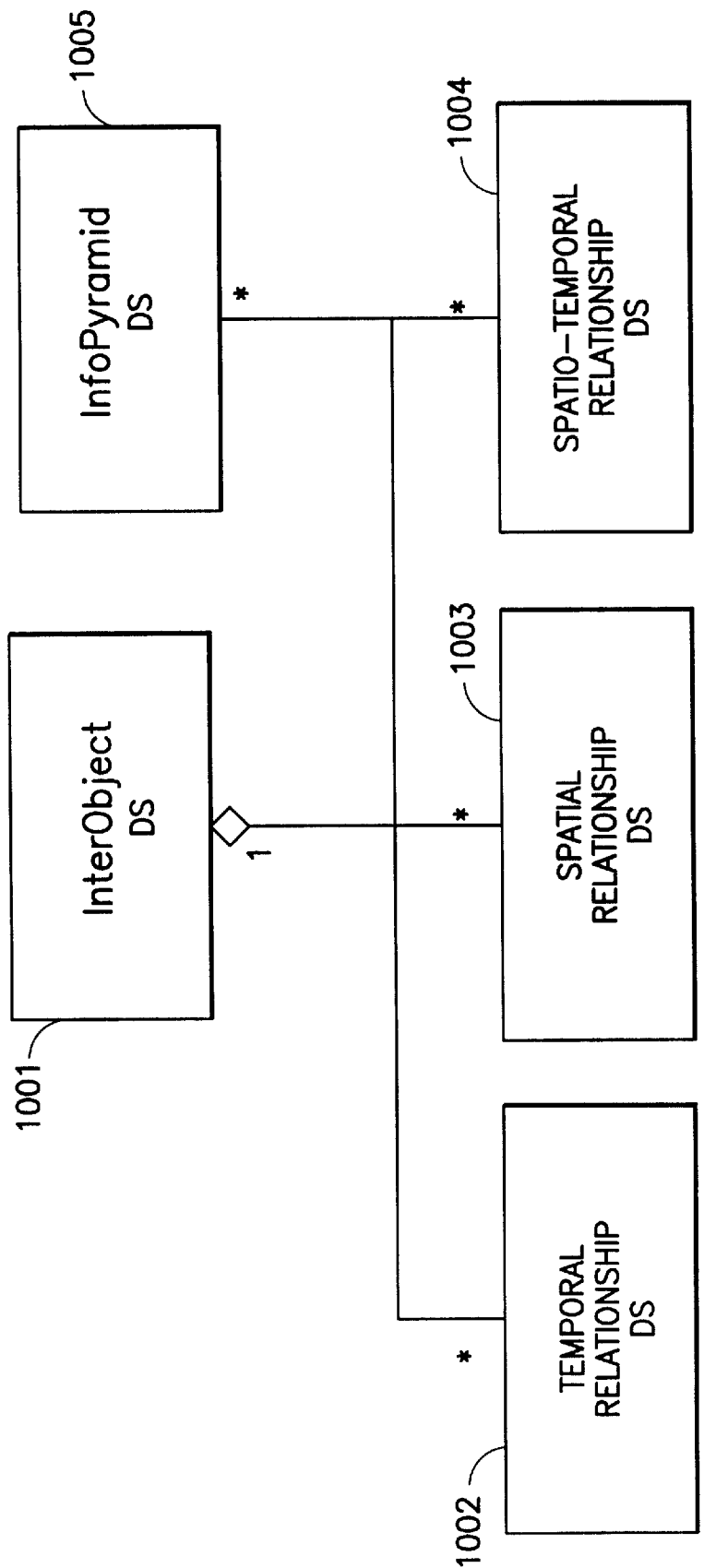
FIG. 10 is a block diagram depicting a data model or description scheme (DS) for inter-InfoPyramid Object description, in accordance with a preferred embodiment of the present invention.

FIG. 10 illustrates an Inter Object Description Scheme (IODS), formed in accordance with a preferred form of the present invention. With reference to FIG. 10, the IODS 1001 preferably accommodates a number of description schemes that describe the relationships among objects at various levels of abstraction. Furthermore, the IODS provides a mechanism for describing object compositions, starting from the terminal object (i.e., the InfoPyramid 1005), and provides descriptions for inter-object relationships, including, for example, temporal 1002, spatial 1003, spatio-temporal 1004, hyper-linking (not shown) and others known in the art. The objects referred to in an IODS can be elementary objects or composite objects. Traditional media objects and InfoPyramid objects are preferably treated as elementary objects (described herein below). An important characteristic of an IODS is its ability to handle time and space flexibly.

Representing Temporal Relationships

Temporal relationships among objects are preferably represented in the IOS, in accordance with the present invention, by a set of temporal elements, such as, for example:

meet,
co-begin,
co-end,
co-occur, with each set of temporal elements preferably describing the corresponding relationship among related objects. The relationship "meet", for example, may be used to sequence objects, "co-begin" may be used to align start times, "co-end" may be used to align end times, "co-occur" may be used to align both start and end times, etc. For example, the relation meet(a, b) preferably describes a sub-scene, where object a is immediately followed by object b; co-begin(a, b) may describe a sub-scene where objects a and b start together; co-end(a, b) may describe objects a and b ending together; co-occur(a, b) to describe objects a and b both starting and ending together.

Additional temporal constraints between pairwise objects may include, but are not limited to:

followed by, where the starting time of one object is larger than the ending time of the second object;

precede by, where the ending time of one object is smaller than the starting time of the second object;

immediately followed by, where the starting time of one object is substantially equal to the ending time of the second object;

immediately preceded by, where the ending time of one object is substantially equal to the starting time of the second object;

start after, where the starting time of one object is after the starting time of a second object;

end before, where the ending time of one object is before the ending time of a second object;

overlap, where the duration of two objects overlap; and contain, where the duration of one object contains the other object.

It should be understood that the present invention further contemplates the concatenation (using concatenation functions known by those having skill in the art) of one or more temporal relationships to describe additional, more complex relationships.

The temporal elements provided by the present invention are similar to what the Synchronized Multimedia Intergration Language (SMIL), which allows for the creation of time-based multimedia delivery over the web, provides as synchronization elements, namely, "seq" and "par" (sequential and parallel elements, respectively). However, IOS provides a set of more general temporal relationships from which simple "seq" and "par" elements can be generated. Furthermore, unlike SMIL, IOS allows built-in flexibility in the object's duration. The flexibility in IOS stems primarily from its spring-like object model, where each object, either elementary or composite, is preferably treated as if it was a spring. This preferred representation of the present invention is described in more detail herein below.

Representing Objects as Springs

In the IOS scheme of the present invention, each object preferably has associated with it a triple of minimum, optimal, and maximum lengths, specified by the author or by the system. As such, an object's duration is preferably specified as a range bounded by a minimum and a maximum, and including the object's optimal length. For example, a certain video clip has a certain duration when played at the speed it was captured at (e.g., 30 frames per second). The multimedia content description framework (MMCDF) of the present invention preferably allows authors to define a range in the playback speed, for example, between 15 frames per second (slow motion by a factor of 2), and 60 frames per second (fast play by a factor of 2). For the exemplary video clip, this results in a maximum and minimum total playback duration, respectively. Note, that it is still possible to dictate only one specific playback duration (which is directly related to the playback speed in the case of video, audio, or animation), by restricting the duration range to a width of zero.

Such spring-like objects can then be connected using the temporal relationships described herein above. This connected-spring model preferably allows built-in flexibility in the delivery system. For instance, time stamps are not required to be fixed, and hardwired. Rather, time stamps may be coded, reflecting the given relationships and the spring properties of the corresponding objects. Furthermore, an acceptable range of playback times of an object can be exploited by the playback (or delivery) system to account for network delays, processor or peripherals speed, etc.

This flexible time stamping mechanism of the present invention has been proposed for MPEG-4 to optionally provide the MPEG-4 delivery system with a mechanism for achieving adaptive temporal synchronization. The motivation of having such an extension is that in environments with unreliable delivery, the presentation of multimedia objects may falter due to the missing of time stamp deadlines. The new, more flexible timing information will have at least two features. First, instead of fixed start and end times, the presentation duration of an object (an elementary stream) may be given a range. Second, the start and end times are preferably made relative to the start and end times of other multimedia objects. This information can then be used by the client to adapt the timing of the ongoing presentation to the environment, while having the flexibility to stay within the presentation author's expectations.

Representing Spatial Relationships

In a similar manner to the representation of temporal relationships, spatial properties can also be specified using relationships, and acceptable ranges, in accordance with a preferred embodiment of the present invention. For instance, a two-dimensional (2D) rectangular object may have associated with it a triple of minimum, optimal, and maximum area requirements, along with minimum, optimal and maximum aspect ratios.

Possible spatial relationships among multiple objects can also be specified using constructs such as:

left-align;
right-align;
top-align; and
bottom-align.

In addition, spatial relationships between pairwise objects may include:

top-of;
bottom-of;
adjacent/neighboring;
near/close by;
within/contained;
north of;
south of;
east of; and
west of.

Note, that spatial operators may refer to both 2D objects (such as images) and 2D+time objects (such as video, presentation, etc.). Consequently, these spatial relationships will have different implications depending on the context of their usage. For 2D objects, the spatial constraints may be evaluated unambiguously. For 2D+time objects, the spatial constraints may have to be evaluated in conjunction with the temporal constraints. Accordingly, the spatial relationships being described may imply, among other things:

- the spatial relationships among/between objects during a specific time instant (i.e., snapshot);
- the spatial relationships among/between objects during an arbitrary point in time;
- the spatial relationships among/between objects for an entire duration; and/or
- the spatial relationships among/between objects during a representative moment, given by a specification of the InfoPyramid or objects.

Furthermore, additional possibilities/relationships that are suitable for use with the present invention may exist such that time is the primary dimension, and as such, temporal constraints may be used to derive additional spatial constraints among objects that are related temporally. The interacting of time/space is known in the art and, therefore, a detailed discussion of the subject matter will not be presented herein.

Figure 5:
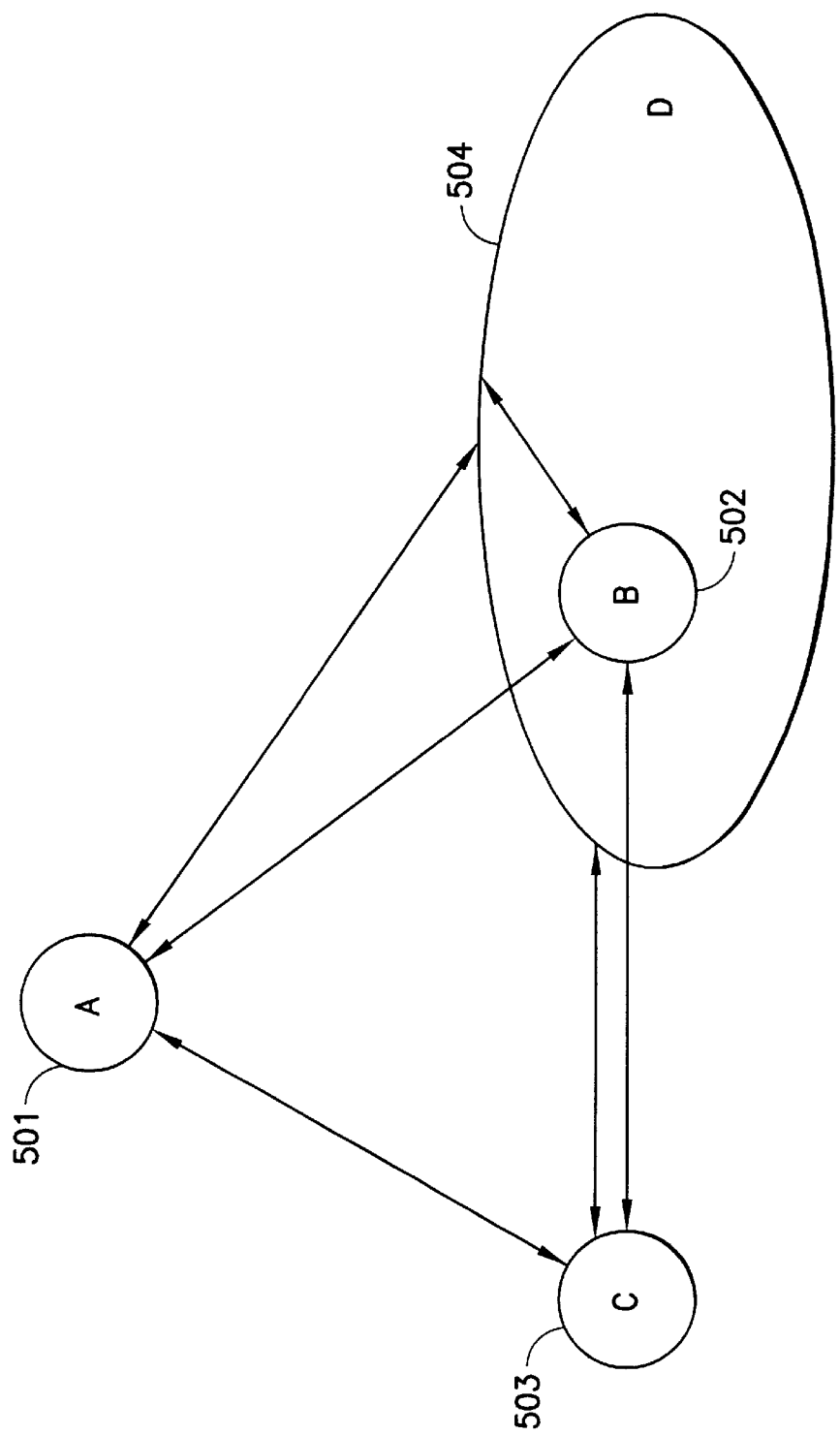
FIG. 5 is a logical flow diagram illustrating an example of Inter Object Specification of four objects with spatial relationships, formed in accordance with the present invention.
Figure 6:
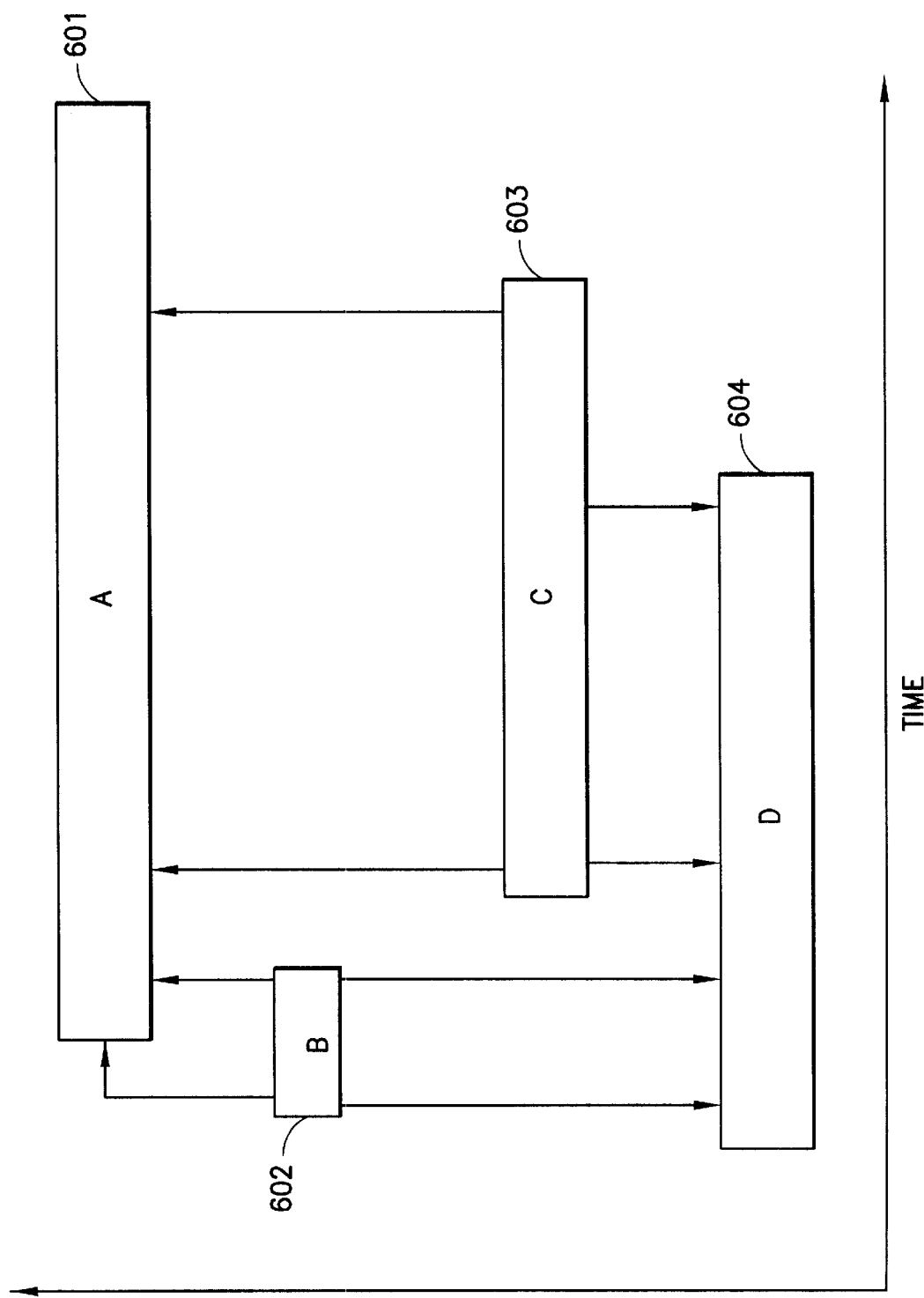
FIG. 6 is a logical flow diagram showing an example of Inter Object Specification of four objects with temporal relationships, formed in accordance with the present invention.

As an example of a spatial relationship, FIG. 5 shows that object A 501 is to the northwest of object B 502; which is to the east of object C 503. Furthermore, Object B is within object D 504. Object D is also to the southeast of object A 501, and to the east of object C 503. Ultimately, a complex graph can be potentially represented unambiguously by a set of pairwise relationships. As an example of a temporal relationship, FIG. 6 shows that object A 601 starts after object B 602, and ends long after object B. Object A starts before object C, and ends after C 603. Object C starts after object D, 604 and ends after object D.

Figure 7:
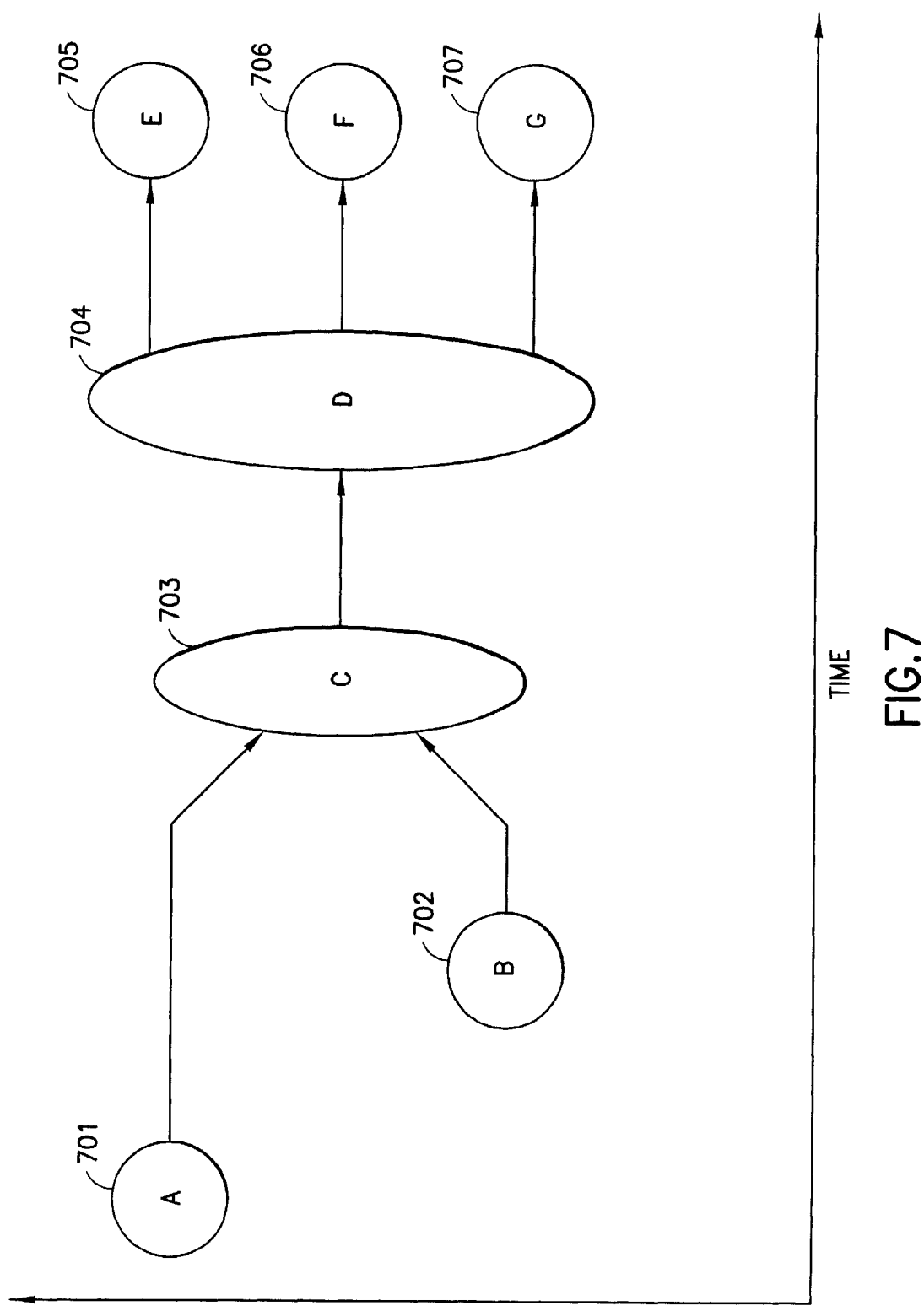
FIG. 7 is a block diagram illustrating an example of Inter Object Specification, formed in accordance with the present invention, in which data objects are merged and split.

An example of the life cycle/duration of objects is illustrated in FIG. 7. Referring to FIG. 7, two objects, namely, object A 701 and object B 702, are shown merged at some time into object C 703. Object C 703 may then be subsequently expanded to object D 704. At that point in time, object D 704 is subsequently split (or forked) into three objects, namely, object E 705, object F 706 and object G 707. This object split and/or merge phenomenon may arise in many applications, such as medical, astrophysical and remote sensing scenarios.

Solving Temporal/Spatial Constraints

Both temporal and spatial constraints can be resolved using a constraint solver, as appreciated by those skilled in the art, and temporal/spatial schedules can be computed automatically if there is a solution that satisfies all the constraints. Suitable techniques for solving temporal and spatial constraints are well known in the art. Accordingly, a detailed discussion of such will not be presented herein.

Stream Description Scheme (SDS)

A stream description, as defined by the present invention, is preferably a mapping from an elementary (or terminal) object or a composite (or nonterminal) object to a serial logical bit stream. Since this description is logical, its mapping to the specific protocol is undetermined. It is to be appreciated that the bit stream may be transmitted via any suitable medium, including dedicated data lines or wireless communication channels, such as cellular, satellite, microwave, or electromotive force (EMF) networks. Possible mediums/protocols which may be employed for carrying the stream may include, but are not limited to, hypertext transport protocol (HTTP), Internet protocol (IP), TCP, Fiber Channel Class 1/2 traffic, AAL class 1 or 2, and emerging digital television (DTV) transmissions.

Although the data description language is not described herein, many of the description languages that are suitable for use with the present invention (e.g., XML) already provide a serialization mapping. For example, the serialization of an XML description over HTTP is well defined, as appreciated by those skilled in the art. In general, the ordering of the serialization may include both inter-object descriptions and InfoPyramid descriptions. As an example, consider the following:

stream description S1 for inter-object description Oc
    Inter-object description Oc for object O12 and object O23
    Inter-object description O12 for object O1 and O2
    InfoPyramid description for object O1
    InfoPyramid description for object O2
    Inter-object description O23 for object O2 and O3
    InfoPyramid description for object O2
    InfoPyramid description for object O3

Due to the scoping rule, the description of object O2 is repeated inside the inter-object description O23. This may be desirable for minimizing the memory requirement for performing content filtering or synthesizing final content. Alternatively, it is also feasible to serialize the stream as:

stream description S1 for inter-object description Oc
    Inter-object description Oc for object O12 and object O23
    Inter-object description O12 for object O1 and O2
    Inter-object description O23 for object O2 and O3
    InfoPyramid description for object O1
    InfoPyramid description for object O2
    InfoPyramid description for object O3

It is to be appreciated that the current stream description scheme would permit either serialization approach, since both descriptions are consistent with the scoping rules.

Aggregation Description Scheme (ADS)

An aggregation may be defined as the union of a collection of terminal or nonterminal objects and the access methods. Components in an aggregation description scheme, in accordance with the present invention, preferably include a description of:

Grand schema: This is the catalog of all of the data and services provided by the aggregation;

Data description: This description preferably includes all of the inter-object specification (IOS) as well as InfoPyramid intra-object specification. This corresponds to the data catalog in the traditional sense, and enables the understanding what is contained in the aggregation.

Service description: This describes the services provided by the aggregation, including search and retrieval of data through the specification of parametric data, or the search and retrieval of data through similarity/fuzzy retrieval using features or semantics, or a combination of both.

Based on the description schemes of the present invention discussed herein, multimedia content can be either analyzed or synthesized according to these schemes. After the analysis/synthesis step, which generally comprises an assessment of the target/intended audience and associated target multimedia devices, the source multimedia content can then be stored using the MMCDF framework of the present invention. This stored content can subsequently be used to provide multimedia content to various devices with different platforms (as in FIG. 2).

Figure 17:
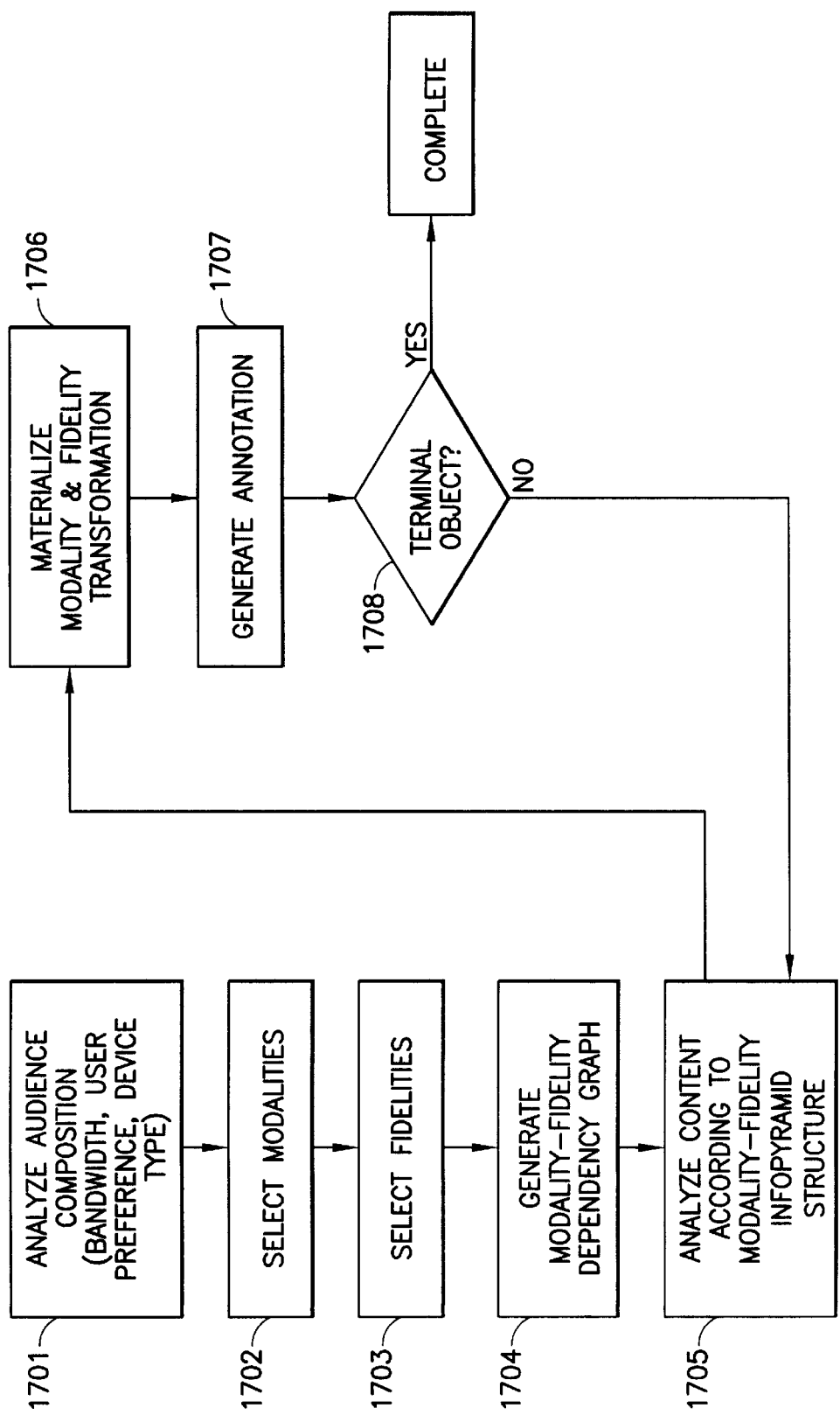
FIG. 17 is a flow diagram illustrating a preferred method of the present invention for describing multimedia content from a multimedia content source, including recursively transforming the multimedia content according to the InfoPyramid data model.

In accordance with a preferred embodiment of the present invention, a method is provided for analyzing source multimedia content, as shown in FIG. 17. With reference to FIG. 17, this method preferably comprises the following steps:

1. Analyze the audience composition 1701: Determine the audience of the multimedia content. This analysis preferably includes the distribution of the user interests (i.e., how many users are interested in video, how many users like to hear the audio, etc.), the distribution of the platform (e.g., WinCE, Palm OS, Java, etc.), devices employed (e.g., WinCE devices, Palm, SmartPhone, WebTV, watchpad, wearable computer, general purpose PC/workstation, etc.), network connection (e.g., wireless, phone line, ADSL, cable modem, local area network, etc.), and connection bandwidth (e.g., from 9600 bps to 1.0625 Gbps).
2. Select Modalities 1702: Based on the distribution analysis, select the target modalities for the given multimedia content. This step preferably includes the generation of a union of the necessary modalities from all users and all supported devices.
3. Select Fidelities 1703: Based on the distribution analysis, select the target fidelities. This step preferably includes the clustering of the range of bandwidth, device resolution, etc.
4. Generate modality-fidelity dependency graph 1704: This step preferably includes generating descriptions (similar to the examples of FIGS. 11–14) for each of the terminal nodes of the source multimedia content.
5. Analyze content 1705: Decompose the multimedia content source according to the description scheme (as illustrated by the examples of FIGS. 7, 8, and 10) to extract InfoPyramid representations of each individual media modality, the intra- and inter-object relationships.
6. Materailize modality and fidelity transformations 1706: Based on the usage statistics, those modalities in the modality-fidelity dependency graph are preferably materialized by invoking the appropriate modality translation and fidelity transformation operators.
7. Generate annotations (1707): Generate necessary annotations of each object, including the type, purpose, intention of use, etc. that may be extracted from the original multimedia content.
8. Repeat steps 5–7 if the current object is not a terminal object 1708 until all the multimedia content has been analyzed.

Figure 18:
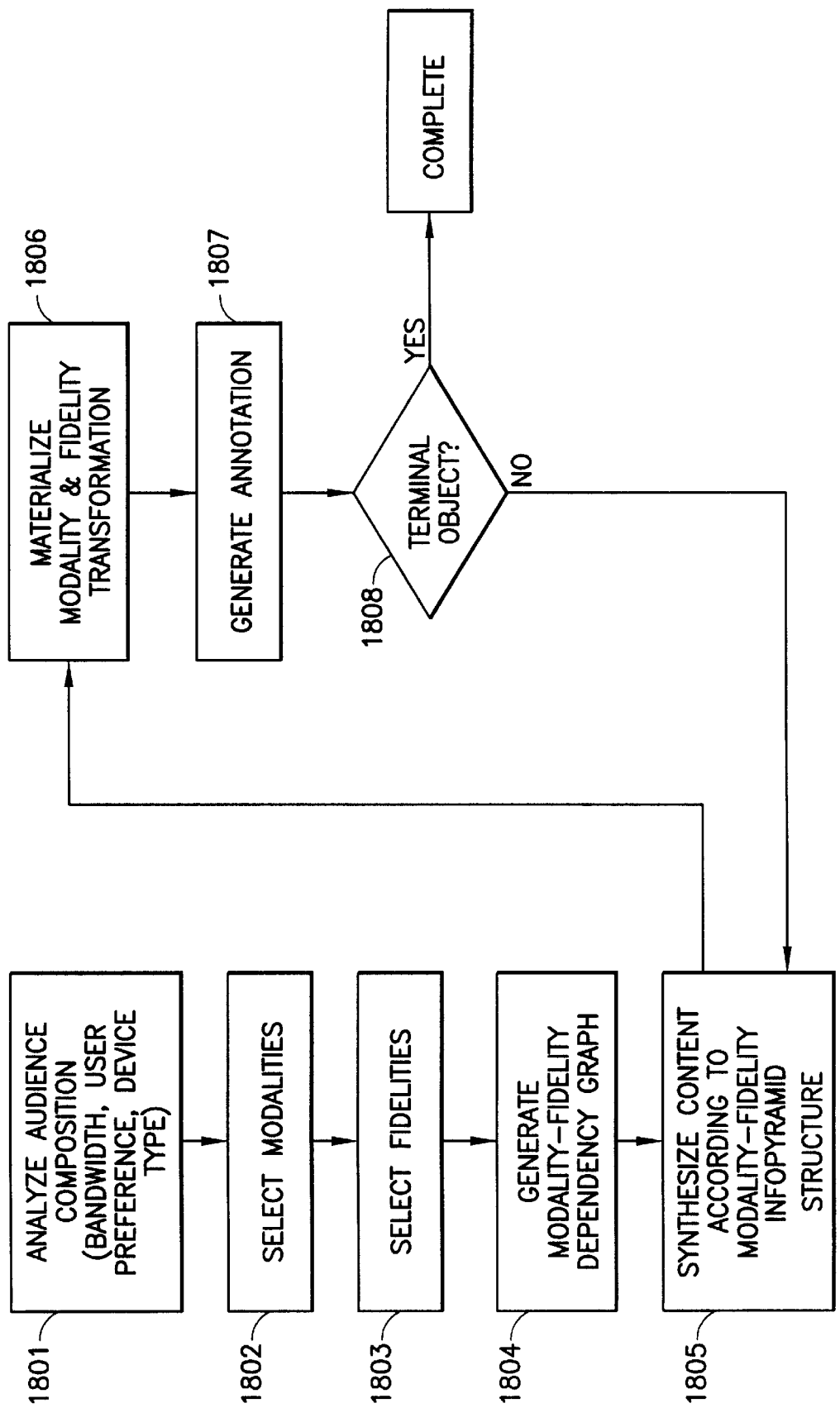
FIG. 18 is a flow diagram illustrating a preferred method of the present invention for synthesizing multimedia content, including combining multimedia content components from target multimedia devices into a composite multimedia object.

In accordance with a preferred embodiment of the present invention, a method is provided for synthesizing a multimedia content source, as shown in FIG. 18. With reference now to FIG. 18, this method preferably comprises the following steps:

1. Analyze the audience composition 1801: Determine the target audience of the multimedia content. This analysis preferably includes the distribution of the user interests (e.g., how many users are interested in video, and how many users like to hear the audio, etc,), the distribution of the platform (e.g., WinCE, Palm OS, Java), devices employed (e.g., WinCE devices, Palm, SmartPhone, WebTV, watchpad, wearable computer, general purpose PC/workstation, etc.), network connection (e.g., wireless, phone line, ADSL, cable modem, local area network, etc.), and connection bandwidth (e.g., from 9600 bps to 1.0625 Gbps).
2. Select Modalities 1802: Based on the distribution analysis, select target modalities for the given multimedia content. This step preferably includes the generation of a union of the necessary modalities from all users and all supported devices.
3. Select Fidelities 1803: Based on the distribution analysis, select target fidelities. This step preferably includes the clustering of the range of bandwidth, device resolution, etc.
4. Generate modality-fidelity dependency graph 1804: This step preferably includes generating descriptions (similar to FIGS. 11–14) for each of the terminal nodes of the multimedia content.
5. Synthesize multimedia content 1805: Combine the multimedia content source according to the description scheme (as illustrated in FIGS. 7, 8, and 10), including the addition of the intra- and inter-object relationships.
6. Materialize modality and fidelity transformations 1806: Based on the usage statistics, those modalities in the modality-fidelity dependency graph are preferably materialized by invoking the appropriate modality translation and fidelity transformation operators.
7. Generate annotations 1807: Generate necessary annotations of each object, including the type, purpose, intention of use, priority of presentation, etc. that may be extracted from the original content.
8. Repeat steps 5–7 if the current object 1808 is not a terminal object until all the content has been analyzed.

In order to more clearly illustrate the possible applications of the system and methods of present invention, several examples are provided herein below. These examples, however, are not intended to limit the scope of the invention.

EXAMPLE 1

Web Image Search Engine

In a Web-based search environment, the multimedia content description system of the present invention may be utilized in the development of a Web image search engine. The objective of the Web image search engine is to catalog images and video information on the World Wide Web and allow users to search the catalog. The Web image search engine preferably uses content descriptors to index the images and video information by visual features, text, and semantics concepts.

In accordance with the present invention, the Web image search engine preferably employs a set of descriptors which are automatically and/or semi-automatically generated. The visual features of the images may be defined by a color histogram and a texture vector which are preferably automatically computed. The system preferably assigns each image and video a set of terms which are automatically extracted from the parent Web document and Web address. Furthermore, the Web image search engine preferably assigns various concept labels to each image and video by looking up the assigned terms in a term-concept dictionary. This process is semi-automatic in the sense that the concept labels may be later verified manually. Each concept class belongs to a concept ontology that is also developed manually.

The content descriptions in the Web image search engine are represented using the InfoPyramid multimedia content description language. The content descriptions types are defined as follows:

<IPMCD classname="color" baseclass="histogram(real)[166]" compare="Euclidean" owner="webimsearch" spec="address"> </IPMCD>, <IPMCD classname="texture" baseclass="histogram (real)[9]" compare="Euclidean" owner="webimsearch" spec="address"> </IPMCD>, <IPMCD classname="text" baseclass="set(term)" compare="String" owner="webimsearch" spec="address"> </IPMCD>, <IPMCD classname="concepts" baseclass="set (concept)" compare="String" owner="webimsearch" spec="address"> </IPMCD>

The Web image search engine specifies the content description instances as follows:

<IPMCD id=999999 color="83203411242342342 . . . " texture="284 . . . " text="term1/term2/term3/ . . . " concepts="concept1/concept2/concept3/ . . . "> </IPMCD>

In this way, any search engine may search the catalog of image and video content descriptions.

EXAMPLE 2

Satellite Image Retrieval System

In a preferred content-based retrieval system of satellite images, image content is represented as an InfoPyramid with four modalities: (1) Pixel, or the original image (2) Feature (3) Semantic and (4) Metadata.

The present invention distinguishes between simple and composite objects. A simple object can be defined as a region of an image that is homogeneous with respect to an appropriate descriptive quantity or attribute. A composite object includes multiple simple objects with pairwise spatial (e.g., adjacent, next to, west of), temporal (e.g., before, after) relationships. A simple object can be defined at any of the modalities.

This system can answer queries such as "find all the regions of cauliflower fields that have clubroot disease." Here, the search target is specified by a composite object containing cauliflower field regions and a clubroot disease regions.

EXAMPLE 3

Internet

In one application, the InfoPyramid is used to allow content providers to represent Internet content in a form that allows its customized delivery according to client device characteristics and user preferences. The InfoPyramid may also be used as a transient structure that facilitates the transcoding of Internet content on-the-fly to customize the retrieval and display of Internet content.

While content negotiation is not a problem addressed by MPEG-7, it is desirable if the MPEG-7 representation also supported content negotiation mechanisms. Otherwise, two representations would have to be used: (1) MPEG-7 for query and (2) another for retrieval. However, the content negotiation framework is needed to satisfy query. Depending on the query, access may be provided to different components of the content. A text-based query may need to examine only the textual transcript, as exposing the video representation to the query would be meaningless and a waste of network/computational resources.

EXAMPLE 4

TV News Application

A TV News application may be used to illustrate the concepts of InfoPyramid and IPDL. As this is a type of application that MPEG-7 would support, it gives an example representation for MPEG-7.

This application automatically captures and indexes television news stories and makes them available for search over the Internet. The system captures news video and the closed caption stream, time stamps and stores them. The closed caption is not aligned to the video due to live nature of news broadcasts. The system uses visual and audio cues to align the closed caption to the video. It then segments the news program into individual news stories. The text transcript of the each story, contained in the closed caption, is fed to a text indexer. A user then queries this database of news stories over the Internet using text queries. First, as in other query systems such as AltaVista, the system presents a summary of the news stories matching the query. The user can then select a story to see the full details.

The video component, which can also be viewed as an InfoPyramid, has different fidelity levels corresponding to different representations. The basic level may be video in AVI format the format the video was captured in). Due to its high data rates (~1 Mb/s), it is suitable only for Intranet delivery over LAN. This video is further compressed, in Bamba which uses H.263 video codec. The Bamba video can be streamed over the Internet to computers connected with modems operating at 28.8 kbs or higher. For further resolution reduction, the next layer may be a set of representative frames or key-frames, which provide a further data-reduced representation of the video. Note that here the resolution reduction lead to a modality transformation from video to still images. These images can be served when a summary representation is required or one of the video representations could not be served due to network bandwidth or client platform capabilities. These images may be statically displayed or synchronized with the audio to provide a slide-show. The text component is obtained from the synchronized closed captions. This text is represented in reduced resolutions by summaries, title and news categories or key words; all obtained by automatic tools or manual annotation. The audio is maintained in two levels, as a wave file (associated with the AVI video) and an audio Bamba stream (associated with the Bamba video stream). The news story itself can be seen as represented at different resolutions from full AVI video through key-frames with text, to audio alone down to the level of just a text title for the story.

This InfoPyramid can be represented in IPDL using XML as:

```
<NEWS-STORY>
  <Station>ABC</Station>
  <date>11/2/97</date>
  <time>5:00pm</time>
  <program>Evening News</program>
  <video>http://videol.ipdl</video> <transcript>http://textl.ipdl</transcript>
</NEWS-STORY>
```

These XML based representations of the new story InfoPyramid are easily readable and comprehensible. It is also easily parsed by machines. The linking mechanism makes explicit the interrelationships between the various components of a news-story and makes it storage independent.

EXAMPLE 5

Query Retrieval Relationship

As we have seen, content in genera) is multi-modal. For example, the new-story has many different video streams, audio streams, key-frames, textual transcript, key-words etc. This means, that depending on a query, the fight modality has to be exposed to the search mechanism. For example, text based queries require access to the textual transcript, while a visual search may make use of the key-frames or the video streams.

Our contention is that query and retrieval are interlinked. A response to a query is the content matching the query being returned. Just as MPEG7 does not specifically address the search mechanism, but the MPEG7 representations have to support search; they also will have to support access even though MPEG7 does not address retrieval. It will be good if the same representation supports both search and retrieval. Just as in search, different components may have to be exposed to meet the search; different components may have to be returned when an access is made. For example, when the matching stories are returned as summaries for the results, the news story InfoPyramid has to return a summary representation (for example, containing the key frames of the video and a summary of the news). It would be inefficient for the news story InfoPyramid to return the news videos, as these may overwhelm the network and also the video representation makes it difficult to browse through a list of news videos. This mechanism for determining the best format of the content to return for satisfying a request is called content negotiation. In the TV News video application, the content negotiation decides which representation of the new story to deliver based on the context: summary, full form, and client with limited bandwidth or limited display capabilities.

Those of ordinary skill in the art will recognize that the present invention has wide commercial applicability to the exchange of multimedia content in general. Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method for describing a multimedia content source including at least one terminal object, said at least one terminal object including one or more modalities, each of said one or more modalities having one or more fidelities associated therewith, said method comprising the steps of:

generating a distribution of one or more modalities and fidelities, said distribution corresponding to an audience of said multimedia content source;

grouping said multimedia content source into one or more target modalities and target fidelities according to said distribution;

generating a modality-fidelity dependency representation for a terminal object in said multimedia content source, said dependency representation including a description scheme comprising predetermined transformation rules for describing at least one of a relationship between two modalities and a relationship between two fidelities;

decomposing the multimedia content source according to said description scheme to create an InfoPyramid representation of each modality;

transforming said multimedia content source according to said modality-fidelity transformation rules;

generating annotations for each object in said multimedia content source; and repeating said decomposing step, said transforming step and said step of generating annotations until every terminal object in said multimedia content source has been processed.

2. A method for creating a multimedia content source including at least one terminal object, said at least one terminal object including one or more modalities, each of said one or more modalities having one or more fidelities associated therewith, said method comprising the steps of:

generating a distribution of one or more modalities and fidelities, said distribution corresponding to an audience of said multimedia content source;

selecting one or more source modalities and associated source fidelities, said source modalities and source fidelities being selected according to a union of said distribution;

generating a modality-fidelity dependency representation for a terminal object in said multimedia content source, said dependency representation including a description scheme comprising predetermined transformation rules for describing at least one of a relationship between two modalities and a relationship between two fidelities;

synthesizing said multimedia content source according to the description scheme and including predetermined intra-object and inter-object relationships;

transforming said multimedia content source according to said modality-fidelity transformation rules;

generating-annotations for each object in said multimedia content source; and repeating said synthesizing step, said transforming step and said step of generating annotations until every terminal object in said multimedia content source has been processed.

* * * * *